US011269573B2

(12) United States Patent
Nagano et al.

(10) Patent No.: US 11,269,573 B2
(45) Date of Patent: Mar. 8, 2022

(54) METHODS AND SYSTEM FOR POLICY-BASED PRINTING USING PUBLIC PRINT SERVER

(71) Applicant: Kyocera Document Solutions, Inc., Osaka (JP)

(72) Inventors: Daisaku Nagano, Pleasant Hill, CA (US); Hiroyuki Takaishi, Pleasant Hill, CA (US); Jin Liang, Dublin, CA (US); Tai Yu Chen, Dublin, CA (US); Michael Ong Martin, Pacheco, CA (US)

(73) Assignee: Kyocera Document Solutions, Inc., Osaka (JP)

( * ) Notice: Subject to any disclaimer, the term of this patent is extended or adjusted under 35 U.S.C. 154(b) by 0 days.

(21) Appl. No.: 17/080,087

(22) Filed: Oct. 26, 2020

(65) Prior Publication Data

US 2021/0042072 A1 Feb. 11, 2021

Related U.S. Application Data

(63) Continuation-in-part of application No. 16/452,038, filed on Jun. 25, 2019, now Pat. No. 10,942,688, and a continuation-in-part of application No. 16/451,913, filed on Jun. 25, 2019, now Pat. No. 10,817,230, and a continuation-in-part of application No. 16/452,041, filed on Jun. 25, 2019, now Pat. No. 10,929,548.

(51) Int. Cl.
*G06F 3/12* (2006.01)

(52) U.S. Cl.
CPC ............ *G06F 3/1238* (2013.01); *G06F 3/129* (2013.01); *G06F 3/1222* (2013.01); *G06F 3/1292* (2013.01)

(58) Field of Classification Search
CPC ...... G06F 3/1238; G06F 3/129; G06F 3/1292; G06F 3/1222
USPC ......................................................... 358/1.14
See application file for complete search history.

(56) References Cited

U.S. PATENT DOCUMENTS

| 10,002,474 B1 | 6/2018 | Fernandez | |
|---|---|---|---|
| 10,114,595 B1* | 10/2018 | Albert | G06F 3/1238 |
| 2002/0040346 A1* | 4/2002 | Kwan | G06Q 10/02 705/51 |
| 2002/0077974 A1* | 6/2002 | Ortiz | G06Q 20/10 705/39 |
| 2012/0162112 A1 | 6/2012 | Cho | |
| 2015/0369589 A1 | 12/2015 | Sochman et al. | |
| 2018/0211237 A1* | 7/2018 | Subbaiya | G06F 3/1219 |
| 2018/0213097 A1 | 7/2018 | Seike | |

(Continued)

*Primary Examiner* — Allen H Nguyen
(74) *Attorney, Agent, or Firm* — Millen, White, Zelano & Branigan, P.C.; William Nixon

(57) ABSTRACT

A policy-based system is implemented to allow access to a private domain to print using a public domain. The private domain includes private servers that store documents. The public domain includes servers and a printing device. A public policy server uses a domain list and a protocol connection with a private authentication server to validate a user and identify which private domain to access. The public policy server receives requests from the printing device to process a print job of a document in the private domain. The policy-based system also determines whether printing operations may occur in a public printing service. A public print server determines whether to allow printing for a user in an organization.

19 Claims, 18 Drawing Sheets

(56) References Cited

U.S. PATENT DOCUMENTS

2018/0341764 A1 11/2018 Chou
2019/0332340 A1* 10/2019 Somaiah ............... G06F 3/1292

* cited by examiner

| | | |
|---|---|---|
| Private Domain 120 | @example1.com | ⎯402 |
| | @example2.com | ⎯404 |
| Private Domain 130 | @company.com | ⎯406 |
| Private Domain N | @firm.com | ⎯408 |
| Private Domain N+1 | @college.com | ⎯410 |
| Private Domain X | @website.com | ⎯412 |

| Organization Table | |
|---|---|
| Organization A | Organization X |
| User(s) | User(s) |
| Policy Credit Value $100 | Policy Credit Value $75 |
| User 1 - $5 | |
| User 2 - $10 | |
| User 3 - $2 | |
| Req. - $1 | |
| Rem Credit Value | Rem Credit Value |

Fig. 11

| | |
|---|---|
| Organization Table | |
| Organization B — 2101A | Organization Y — 2101X |
| User(s) — 2102A | User(s) — 2102X |
| Policy Credit Value $100 — 2019A | Policy Credit Value $75 — 2019X |
| User 1 - $5 — 2108A | — 2108X |
| User 2 - $10 — 2110A | — 2110X |
| User 3 - $2 — 2112A | |
| Req. - $1 — 2114A | |
| Rem Credit Value — 2106A | Rem Credit Value — 2106X |

METHODS AND SYSTEM FOR POLICY-BASED PRINTING USING PUBLIC PRINT SERVER

FIELD OF THE INVENTION

The present invention relates to a method of using a public server to implement policy-based printing operations. The system includes a public and private network that supports the policy used for printing operations, wherein the policy is implemented using a public print server using a credit for an organization.

DESCRIPTION OF THE RELATED ART

Existing policy-based printing and scanning systems mostly operate within a closed private domain environment. Print and scan data submitted by users may be only accessible within a single domain environment. Some users, such as on-the-go users including insurance and real estate agents, sales executives, lawyers, and company executives, require the capability to access printing data beyond an office environment. These users travel extensively and find themselves needing to print or scan documents in public locations, such as convenience stores, libraries, airports, copy and printing service stores, and the like. At these locations, the users may not reliably access the printing data. Further, these public locations may not support policy-based printing or scanning.

SUMMARY OF THE INVENTION

A policy-based printing system is disclosed. The policy-based printing system includes a public print service to manage documents for an organization. The public print service is a cloud-based network. The policy-based printing system includes a cloud-based public server to store a document from a user associated with the organization. The public server includes an organization table for the organization associated with the user. The organization has a policy credit value for print jobs within the public print service. The policy credit value is stored in the organization table. The policy-based printing system also includes a printing device to print the document from the public server through the public print service. The public server is configured to determining a remaining credit value for the organization based on the policy credit value and to send the document to the printing device based upon the remaining credit value.

A policy-based printing method is disclosed. The policy-based printing method includes accessing a cloud-based public print service from a printing device. The policy-based printing method also includes restricting print usage within the public print service for an organization using a policy credit value provided at a cloud-based public server. The policy-based printing method also includes generating a print code for a document stored on the public server to a user within the organization. The policy-based printing method also includes sending the print code to a user device for the user. The policy-based printing method also includes determining a remaining credit value for the organization at the public server using the policy credit value and an organization table. The policy-based printing method also includes requesting the document to print on the printing device connected to the public print service using the print code. The policy-based printing method also includes determining whether to allow the document to print according to the remaining credit value. The policy-based printing method also includes printing the document at the printing device, if allowed.

A policy-based printing method is disclosed. The policy-based printing method includes applying a policy credit value for an organization at a public server. The policy-based printing method also includes updating an organization table at a public server with the policy credit value for the organization. The policy-based printing method also includes uploading a document to the public server from a user of the organization using a cloud-based public print service. The policy-based printing method also includes generating a print code for the document. The policy-based printing method also includes accessing the cloud-based public print service through a printing device. The policy-based printing method also includes requesting the document to be printed on the printing device connected to the public print service. The policy-based printing method also includes determining a remaining credit value for the organization based on the organization table and the policy credit value at the public server. The policy-based printing method also includes determining whether to print the document according to the remaining credit value at the public server. The policy-based printing method also includes sending the document to the printing device from the public server based on the determining whether to print step. The policy-based printing method also includes printing the document at the printing device using the public print service.

A policy-based printing system is disclosed. The policy-based printing system includes a public print server to store a document from a user. The public print server includes an organization table having at least one organization associated with the user. The policy-based system also includes a private policy server connected to the public print server. The private policy server includes a policy for the at least one organization in the organization table. Each of the at least one organization has a policy credit value set by the policy and stored in the organization table. A policy-based printing system also includes a printing device to print the document from the public print server. The public print server is configured to determine a remaining credit value for the at least one organization based on the policy credit value and to send the document to the printing device based upon the remaining value.

A policy-based printing method is disclosed. The policy-based printing method includes restricting print usage for an organization using a policy credit value set forth in a policy at a public print server. The policy-based printing method also includes generating a print code for a document stored on the public print server to user within the organization. The policy-based printing method also includes sending the print code to a user device for the user. The policy-based printing method also includes determining a remaining credit value for the organization at the public print server using the policy credit value and an organization table. The policy-based printing method also includes requesting the document to print on a printing device connected to the public print server using the print code. The policy-based printing method also includes determining whether to allow the document to print according to the remaining credit value. The policy-based printing method also includes printing the document at the printing device if allowed.

A policy-based printing method is disclosed. The policy-based printing method includes applying a policy at a private policy server to determine a policy credit value for an organization. The policy-based printing method also includes updating an organization table at a public print server with the policy credit value for the organization. The policy-based printing method also includes uploading a document to the public print server from a user of the organization. The policy-based printing method also includes generating a print code for the document. The policy-based printing method also includes requesting the document to be printed on a printing device connected to the public print server. The policy-based printing method also includes determining a remaining credit value for the organization based on the organization table and the policy credit value. The policy-based printing method also includes determining whether to print the document according to the remaining credit value at the public print server. The policy-based printing method also includes sending the document to the printing device from the public print server based on the determining whether to print step. The policy-based printing method also includes printing the document at the printing device.

BRIEF DESCRIPTION OF THE DRAWINGS

Various other features and attendant advantages of the present invention will be more fully appreciated when considered in conjunction with the accompanying drawings.

FIG. 4A illustrates a domain list for use within the policy-based printing system according to the disclosed embodiments.

FIG. 11 illustrates an organization table on the public print server according to the disclosed embodiments.

FIG. 15 illustrates an organization table on the public print server according to the disclosed embodiments.

DETAILED DESCRIPTION OF THE PREFERRED EMBODIMENTS

Reference will now be made in detail to specific embodiments of the present invention. Examples of these embodiments are illustrated in the accompanying drawings. Numerous specific details are set forth in order to provide a thorough understanding of the present invention. While the embodiments will be described in conjunction with the drawings, it will be understood that the following description is not intended to limit the present invention to any one embodiment. On the contrary, the following description is intended to cover alternatives, modifications, and equivalents as may be included within the spirit and scope of the appended claims. Numerous specific details are set forth in order to provide a thorough understanding of the present invention.

The disclosed embodiments use an authentication server, a policy server, a file server, a network enabled printing device, and a public domain server. At the printing device, a user may provide authentication information, such as a username or password. The authentication information is transmitted from the device to a public domain server that processes the username for domain information. The domain information is matched to a domain on record and a private server is identified that can handle the domain authentication. The public domain server, through a direct connection to the private server, will go through a series of steps to obtain an authentication token, a policy applicable to the user, a job list of the user, and the job binary data for printing a print job on the printing device.

Figure 1:
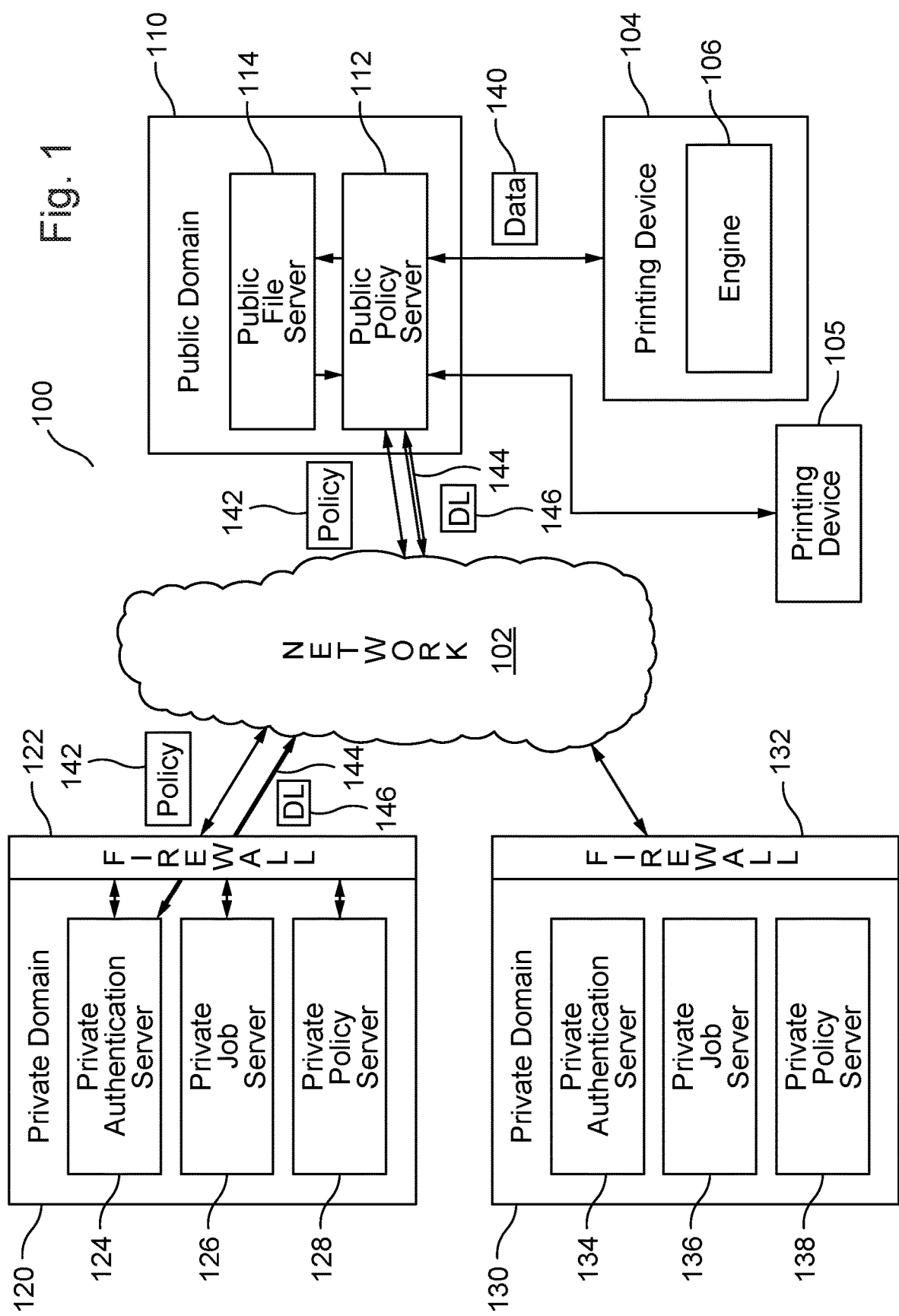
FIG. 1 depicts a system to implement policy-based printing on a printing device according to the disclosed embodiments.

FIG. 1 depicts a system 100 to implement policy-based printing on a printing device 104 according to the disclosed embodiments. System 100 includes network 102 which exchanges data between the public and private domains within system 100. System 100 allows a user to retrieve a print job having job binary data 140 from a private domain server to print on printing device 104. Printing device 104 may be any device that processes the binary data to generate an electronic document that is then printed or accessed by the user. Printing device 104 also may be known as an image forming apparatus or a multi-functional printer. For example, printing device 104 may print on a sheet of paper the document generated from binary data 140. Alternatively, printing device 104 may display the electronic document to the user. Printing device 104 also may store the binary data for the print job. Printing device includes engine 106, which performs many of the operations to print, scan, store, modify, and the like. Printing device 104 and engine 106 are disclosed in greater detail below with reference to FIG. 2.

System 100 include public domain 110 and private domains 120 and 130. Public domain 110 may represent a collection of public servers and devices linked to network 102. In some embodiments, these servers are cloud servers.

Public domain 110 also may be known as a public network of the public servers. Public domain 110 is accessible by printing device 104. Additional printing devices may connect to public domain 110, such shown by printing device 105. The printing devices may be located in public places, such as convenience stores, libraries, printing and copying stores and kiosks, and the like. Users may access the printing devices and, in turn, the servers within public domain 110. The users may need to validate their ability to access public domain 110 through a connected printing device.

Public domain 110 includes public policy server 112. Public policy server 112 interacts with private domains 120 and 130 as well as printing devices 104 and 105. Public policy server 112 may act as the middle man between public domain 110 and the private domains. Public policy server 112 may generate and store tokens used to implement the policy-based operations disclosed below. It also may store and allow access to a policy 142 received from a private domain, upon request. Policy 142, disclosed in greater detail below, outlines what a user can and cannot do when printing to printing device 104 from a private domain.

Public file server 114 is connected to public policy server 112. Public file server 114 may store or host binary data 140 for print job from a private domain. Printing device 104 may retrieve binary data 140 securely for a print job. In some embodiments, printing device 104 does so through public policy server 112. Public file server 114 also may receive binary data 140 from a server in a private domain, as disclosed below.

System 100 includes private domains 120 and 140. System 100 may include additional private domains, not shown here. Each private domain may include a plurality of private servers that are protected by a firewall from access from network 102. For example, private domain 120 includes firewall 122. Firewall 122 may be a software or hardware device that filters data and information coming over network 102 to private domain 120 for malicious or unauthorized access. If an incoming packet of data is flagged by the filters in firewall 122, then it is not allowed through to private domain 120. Firewall 132 may serve the same function for private domain 130.

Private domain 120 includes private authentication server 124, private job server 126, and private policy server 128. Private domain 130 includes private authentication server 134, private job server 126, and private policy server 128. The servers for private domain 120 are disclosed below, but their functionality may apply to the servers in private domain 130. Further, additional servers may be in a private domain and used securely to exchange information over network 102.

Private authentication server 124 is a private domain server that will provide authentication and authorize a user to prove his/her identify. Private authentication server 124 may be the main server that connects the private and public domain information exchange. In some embodiments, private authentication server 124 establishes a protocol connection 144 with public policy server 112 to provide a domain list 146 for access to private domain 120. Private authentication server 124 also verifies a user trying to access private domain 120 using public policy server 112.

Private job server 126 is a private domain server that stores all the binary data for the job files, or print jobs. When a user wants to print out a job file at printing device 104, private job server 126 should be queried in order to retrieve binary data 140 to generate the print job. Private job server 126 may forward binary data 140 to public file server 114 according to policy 142.

Private policy server 128 is a private domain server that hosts or stores all the policies, such as policy 142, related to a user. When printing device 104 attempts to perform any function, it should request private policy server 128 determine whether the user is allowed to do so. Private policy 128 may do the determination via public policy server 112.

The disclosed embodiments allow access to private servers from a public domain or to print on printing device 104 within a public network. An intranet application may do the authentication and job spooling so users need to authenticate printing device 104 before use. A policy may be associated with where a user can print, what kind of paper, number of pages, and the like. For example, some users may want to print from a public location, such as a convenience store, and want to access a private server that stores the print jobs. They would need access from network 102.

In some embodiments, public policy server 112 is a cloud server. Public policy server 112 may not be able to do accounting policy management to determine whether a user is allowed to print at printing device 104. Private domains 120 and 130 can operate over the cloud. Public policy server 112 may enforce the rules of the policy but management of the policy is still at a private server. Public policy server 112 also needs to distinguish between the private servers and private domains. Thus, if a user is outside the private network for a private domain, public policy server 112 will find the correct private domain to connect. That private domain will validate the user and access or use of the print job.

Figure 2:
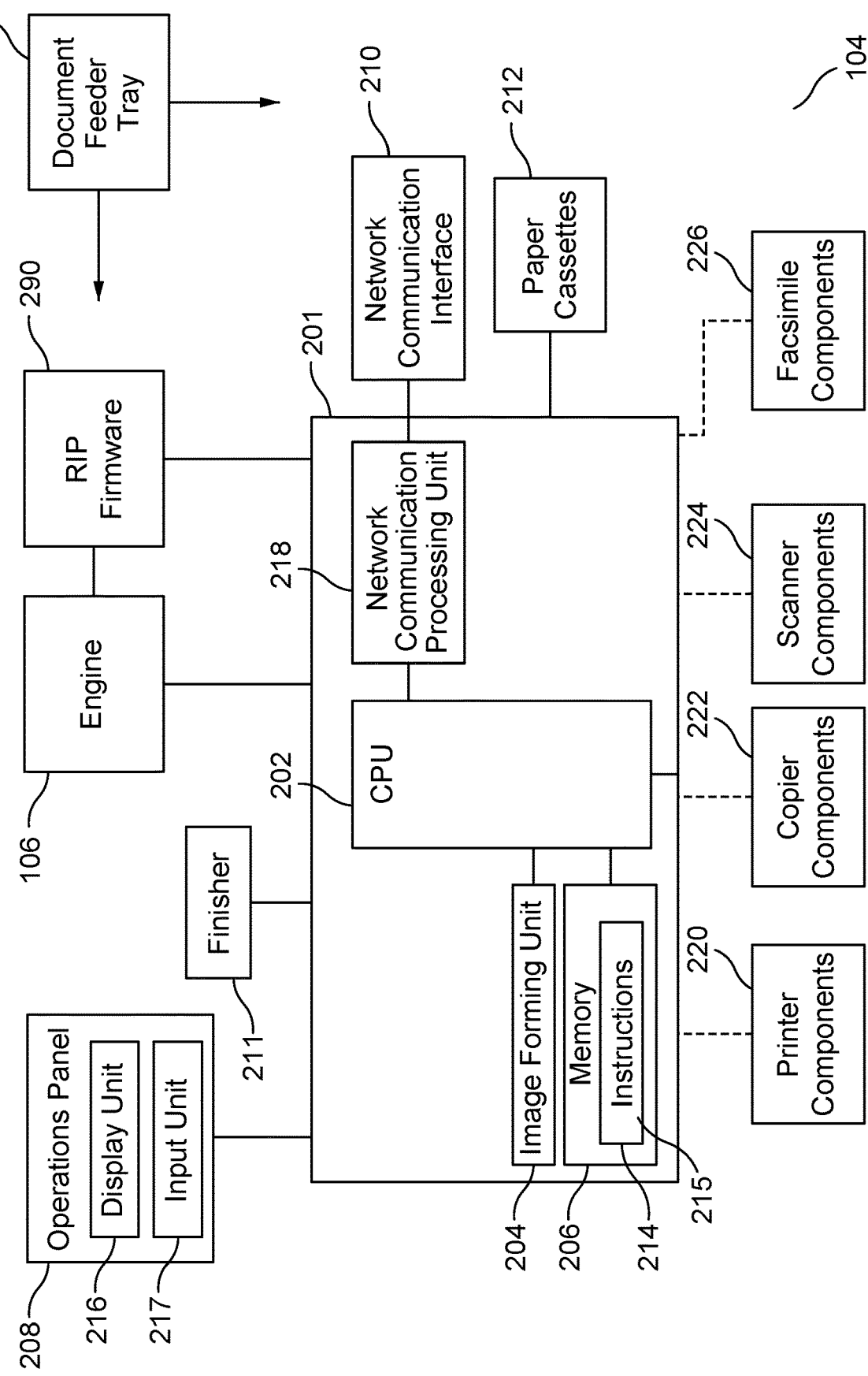
FIG. 2 illustrates a block diagram of components of the printing device used in conjunction with the authentication system according to the disclosed embodiments.

FIG. 2 illustrates a block diagram of components of printing device 104 used in conjunction with system 100 according to the disclosed embodiments. The architecture shown in FIG. 2 may apply to any multi-functional printer or image forming apparatus that scans documents to perform other functions, such as printing, storing, copying, and the like. As disclosed above, printing device 104 may send and receive data from public domain 110 and private domains 120 and 130.

Printing device 104 includes a computing platform 201 that performs operations to support these functions. Computing platform 201 includes a computer processing unit (CPU) 202, an image forming unit 204, a memory unit 206, and a network communication interface 210. Other components may be included but are not shown for brevity. Printing device 104, using computing platform 201, may be configured to perform various operations, such as scanning, copying, printing, receiving or sending a facsimile, or document processing. As such, printing 104 may be a printing device or a multi-function peripheral including a scanner, and one or more functions of a copier, a facsimile device, and a printer. To provide these functions, printing device 104 includes printer components 220 to perform printing operations, copier components 222 to perform copying operations, scanner components 224 to perform scanning operations, and facsimile components 226 to receive and send facsimile documents. CPU 202 may issue instructions to these components to perform the desired operations.

Printing device 104 also includes a finisher 211 and one or more paper cassettes 212. Finisher 211 includes rotatable downstream rollers to move papers with an image formed surface after the desired operation to a tray. Finisher 211 also may perform additional actions, such as sorting the finished papers, binding sheets of papers with staples, doubling, creasing, punching holes, folding, and the like. Paper cassettes 212 supply paper to image the various components 220, 222, 224, and 226 to create the image formed surfaces on the papers. Paper cassettes 212 may include papers having various sizes, colors, composition, and the like. Paper cassettes 212 may be removed to refill as needed.

Document processor input feeder tray 230 may be the physical components of printing device 104 to receive papers and documents to be processed. A document is placed on or in document processor input feeder tray 230, which moves the document to other components within printing device 104. The movement of the document from document processor input feeder tray 230 may be controlled by the instructions input by the user. For example, the document may move to a scanner flatbed for scanning operations. Thus, document processor input feeder tray 230 provides the document to scanner components 220. As shown in FIG. 2, document processor input feeder tray 230 may interact with engine firmware 106 to perform the desired operations.

Memory unit 206 includes memory storage locations 214 to store instructions 215. Instructions 215 are executable on CPU 202 or other processors associated with printing device 104, such as any processors within components 220, 222, 224, or 226. Memory unit 206 also may store information for various programs and applications, as well as data specific to printing device 104. For example, a storage location 214 may include data for running an operating system executed by computing platform 201 to support the components within printing device 104. According to the disclosed embodiments, memory unit 206 may store the tokens and codes used in performing the authentication operations for printing device 104.

Memory unit 206 may comprise volatile and non-volatile memory. Volatile memory may include random access memory (RAM). Examples of non-volatile memory may include read-only memory (ROM), flash memory, electrically erasable programmable read-only memory (EEPROM), digital tape, a hard disk drive (HDD), or a solid-state drive (SSD). Memory unit 206 also includes any combination of readable or writable volatile memories or non-volatile memories, along with other possible memory devices.

Computing platform 201 may host one or more processors, such as CPU 202. These processors are capable of executing instructions 215 stored at one or more storage locations 214. By executing these instructions, the processors cause printing device 104 to perform various operations. The processors also may incorporate processing units for specific purposes, such as application-specific integrated circuits (ASICs) and field programmable gate arrays (FPGAs). Other processors may be included for executing operations particular to components 220, 222, 224, and 226. In other words, the particular processors may cause printing device 104 to act as a printer, copier, scanner, and a facsimile device.

Printing device 104 also includes an operations panel 208, which may be connected to computing platform 201. Operations panel 208 may include a display unit 216 and an input unit 217 for facilitating interaction with a user to provide commands to printing device 104. Display unit 216 may be any electronic video display, such as a liquid crystal display (LCD). Input unit 217 may include any combination of devices that allow users to input information into operations panel 208, such as buttons, a touch screen, a keyboard or keypad, switches, dials, and the like. Preferably, input unit 217 includes a touch-screen digitizer overlaid onto display unit 216 that senses touch to receive inputs from the user. By this manner, the user interacts with display unit 216. Using these components, one may enter an identification code 138 generated by mobile application 110 into printing device 104.

Printing device 104 also includes network communication processing unit 218. Network communication processing unit 218 may establish a network communication, such as a wireless or wired connection with one or more other image forming apparatuses and a server in an image forming system. CPU 202 may instruct network communication processing unit 218 to transmit or retrieve information over a network using network communication interface 210. As data is received at computing platform 201 over a network, network communication processing unit 218 decodes the incoming packets and delivers them to CPU 202. CPU 202 may act accordingly by causing operations to occur on printing device 104. CPU 202 also may retrieve information stored in memory unit 206, such as settings for printing device 104.

Printing device 104 also includes engine 106. Engine 106 may be a combination of hardware, firmware, or software components that act accordingly to accomplish a task. For example, engine 106 is comprised of the components and software to print a document. It may receive instructions from computing platform 201 after user input via operations panel 208. Alternatively, engine 106 may receive instructions from other attached or linked devices.

Engine 106 manages and operates the low-level mechanism of the printing device engine, such as hardware components that actuate placement of toner onto paper. Engine 106 may manage and coordinate the half-toner, toner cartridges, rollers, schedulers, storage, input/output operations, and the like. Raster image processor (RIP) firmware 290 that interprets the page description languages (PDLs) would transmit and send instructions down to the lower-level engine 106 for actual rendering of an image and application of the toner onto paper during operations on printing device 104.

Figure 3:
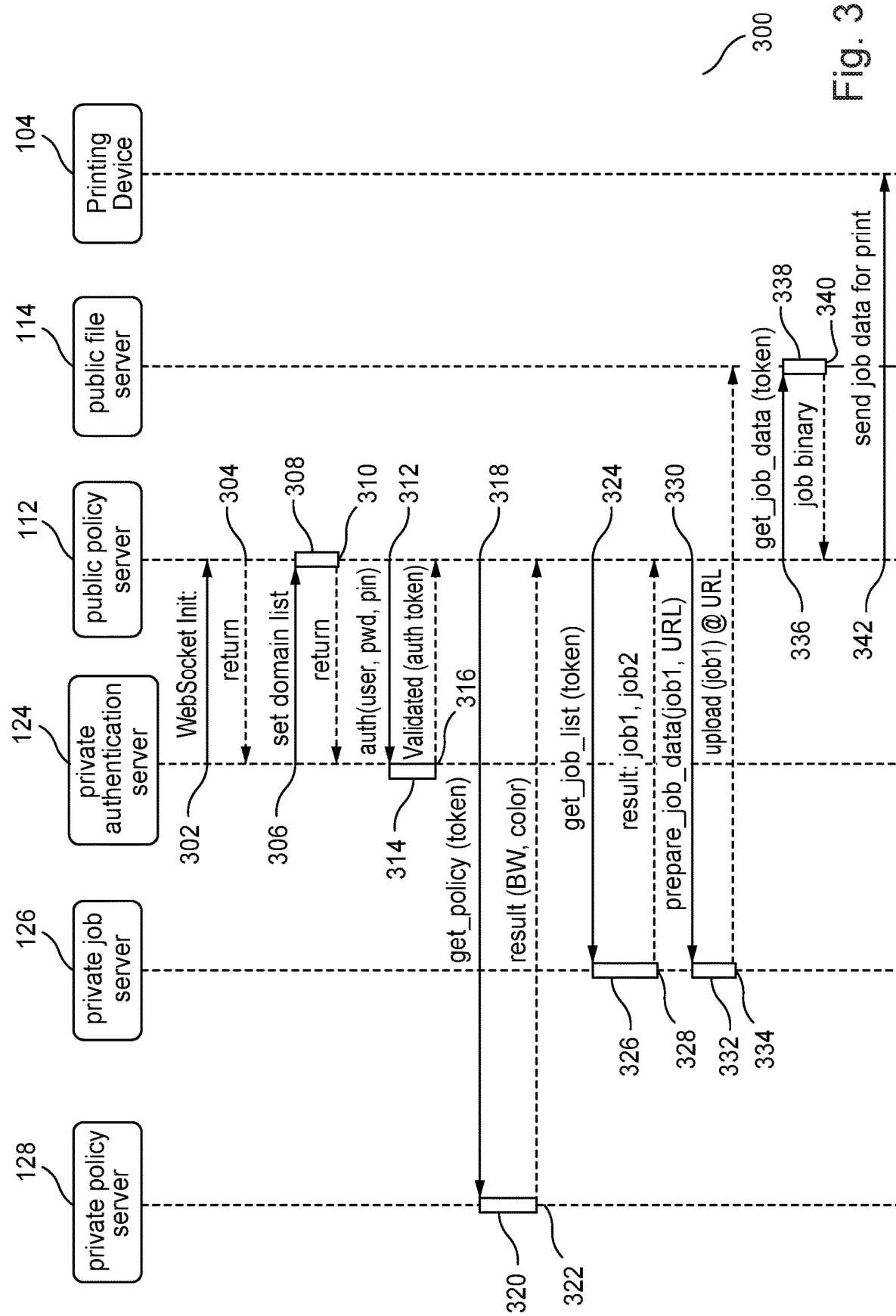
FIG. 3 illustrates a flow diagram for implementing a policy-based printing system according to the disclosed embodiments.

FIG. 3 depicts a flow diagram 300 for implementing policy-based printing system 100 according to the disclosed embodiments. In disclosing the embodiments shown by flow diagram 300, reference may be made to elements shown in FIGS. 1-2 and 4A, 4B, and 5. Flow diagram 300 shows the operations between the various servers disclosed in FIG. 1 above. Flow diagram 300 also depicts the actions taken at the various servers. The private and public servers may perform additional operations and actions not shown herein. The operations may be executed over network 102. Further, flow diagram 300 shows the operations between public domain 110 and private domain 120. Thus, firewall 122 may exist between the public servers and the private servers. The same operations may be executed between public domain 110 and private domain 130.

The processes disclosed by flow diagram 300 seek to solve the problem of how to authenticate a user in one location, such as a convenience store with printing services, that he/she is within an organization that has a policy applicable to the user. Further, the policy is stored in a private domain not readily accessible from the printing device at the convenience store. The printing device is connected to a public network and may be part of a public domain, such as public domain 110. The disclosed embodiments enable the user and the organization to implement the policy, which is applicable to the private domain, within the public domain of the printing device located in the convenience store.

Operation 302 executes by private authentication server 124 sending an initialization request to public policy server 112. As disclosed above, private authentication server 124 is within private domain 120 and public policy server 112 is within public domain 110. To send the initialization request, an administrator enter information about public policy server 112. Such information may include server network address, location, server capabilities, and the like. Once the information is entered, private authentication server 124 generates a verification token 502 which verifies that public policy server 112 is acceptable to receive information and communicate with the private authentication server.

Operation 304 executes by returning acceptance of the initialization request and establishing a protocol connection 144 between private authentication server 124 and public policy server 112. Protocol connection 144 may stay established as long as public policy server has verification token 502. Verification token 502 may be stored on public policy server 112 and presented whenever verification is required by private authentication server 124. Protocol connection 144 provides a persistent connection between private authentication server 124 and public policy server 112 that allows the servers to send data at any time. Protocol connection 144 preferably may be known as a WebSocket connection, which provides a full-duplex communication channel over a single connection. Preferably, protocol connection 144 uses a secure protocol.

Operation 306 executes by providing a domain list 400 from private authentication server 124 to public policy server 112. This operation also may include providing the information about the private authentication server. Action 308 executes by setting domain list 400 at public policy server 112 to include domain information for private authentication server 124. Public policy server 112 may refer to domain list 400 whenever a user attempts to print from a private domain. Public policy server 112 may use information provided by the user to determine which domain to obtain policy 142. For example, public policy server 112 may be connected to more than one private domain. Domain list 400 determines which private domain applies to a user trying to print.

FIG. 4A depicts an example domain list according to the disclosed embodiments. Domain list 400 may be a file having fields for the private domains and the email domains associated with each domain. A user is identified as part of a domain using his/her email address. Public policy server 112 will compare the email provided by the user to determine which private domain to access. As shown in FIG. 4A, private domain 120 may be associated with two email domains 402 and 404. A user having an email domain with "@example1.com" or "@example2.com" will have its policy and associated documents located on private domain 120. A user having an email domain 406 with "@company.com" will have its policy and associated documents located on private domain 130. Additional private domains may be served by public policy server 112. Private domain N will receive requests for policies of users having email domain 408 of "@firm.com" and private domain N+1 will receive requests for policies of users having email domain 410 of "@college.com."

As can be seen, companies, firms, and colleges have an interest in keeping their network domains private. Further, these entities may wish to limit use of printing devices within public domains according to a policy. Domain list 400 also may include an entry for a public domain, such as public domain X. In some instances, a public domain also may include policies to limit capabilities of a user on a printing device 104. These policies, however, may not be within a private domain and available for retrieving through a public network connection. An email domain of "@website.com" may direct public policy server 112 to a public domain for the associated policy 142. Referring back to FIG. 3, operation 310 returns an acknowledgement to private authentication server 124 that domain list 400 has been set and protocol connection 144 exists with public policy server 112.

Operation 312 executes when a user wants to print a document at printing device 104 coupled to public policy server 112. Authentication information 504 is provided from public policy server 112 to private authentication server 124. In some embodiments, the user enters a username and password that is captured by public policy server 112. For example, the user may enter this information at printing device 104 which forwards it to public policy server 112. Alternatively, the user may connect to public policy server 112 through an application on a mobile device or the like to provide authentication information 504.

In other embodiments, the user may enter a code, such as a personal identification number (PIN), that retrieves this information to provide it to public policy server 112. Public policy server 112 receives the code and matches the user information when the code is provided. Other embodiments may use a graphical code or identification card having a number that provides this information. Operation 312 sends this authentication information 504, such as username, password and PIN, to private authentication server 124.

Action 314 executes by authenticating the user with authentication information 504. Thus, user information is not stored on public policy server 112. Authentication still occurs in private domain 120 behind firewall 122. If the user is authenticated, then action 314 also includes private authentication server 124 generating authentication token 506. Operation 316 executes by indicating that the user has been validated and providing authentication token 506 to public policy server 112. Public policy server 112 may assign authentication token 506 to the user. Using the PIN example, the entered PIN may be associated with authentication token 506.

Private authentication server 124 also may provide an email address or the email domain, such as email domains 402-412 shown in FIG. 4A, to public policy server 112 if this information is not already available. For example, it may be too cumbersome to enter email addresses at printing device 104. Further, the administrators of private domain 120 may not want valid email addresses being entered at printing device 104 on a public network or in a public place. Thus, no email address is provided to public policy server 112 from within public domain 110 but, instead, from private domain 120. Moreover, private authentication server 124 may provide only the domain and not the actual email address.

Once validated, public policy server 112 now retrieves a policy 142 from private policy server 128. Operation 318 executes by getting policy 142. The email domain is compared against domain list 400 to determine which private domain to query for the policy. In this example, user@example1.com is the email provided to public policy server 112. It compares the email to domain list 400 to determine the applicable policy is within private domain 120. Public policy server 112 sends determined domain 508, such as example1.com, along with authentication token 506 to private policy server 128 in operation 318. If the next user has an email domain of @company.com, then public policy server 112 determines that domain 508 is company.com and that the applicable policy is located in private domain 130.

Action 320 executes by identifying policy 142 as being applicable to the user based on domain 508. Authentication token 506 may be associated with the user and this information provided from private authentication server 124.

Figure 4B:
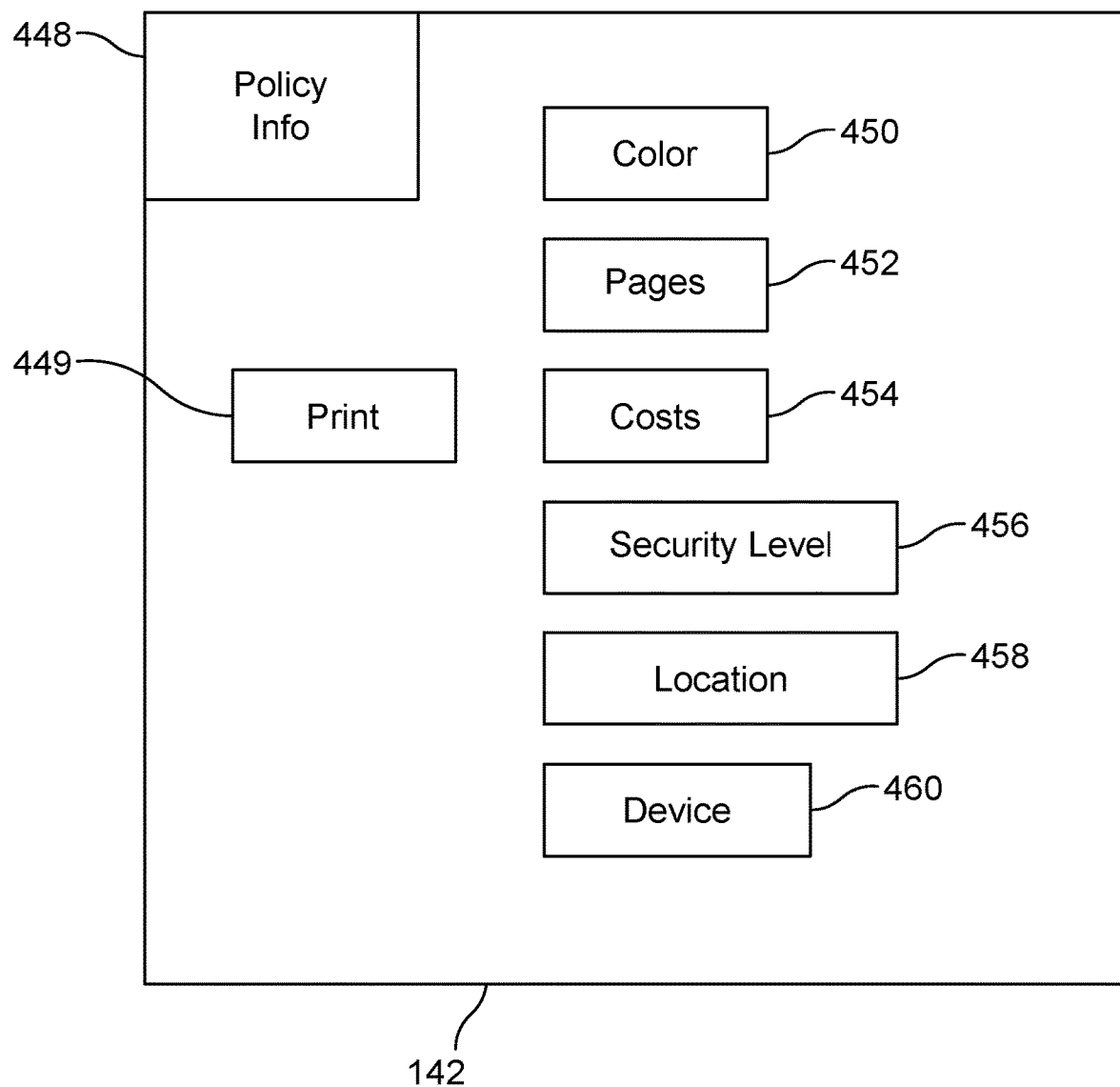
FIG. 4B illustrates a policy for use within the policy-based printing system according to the disclosed embodiments.
Figure 5:
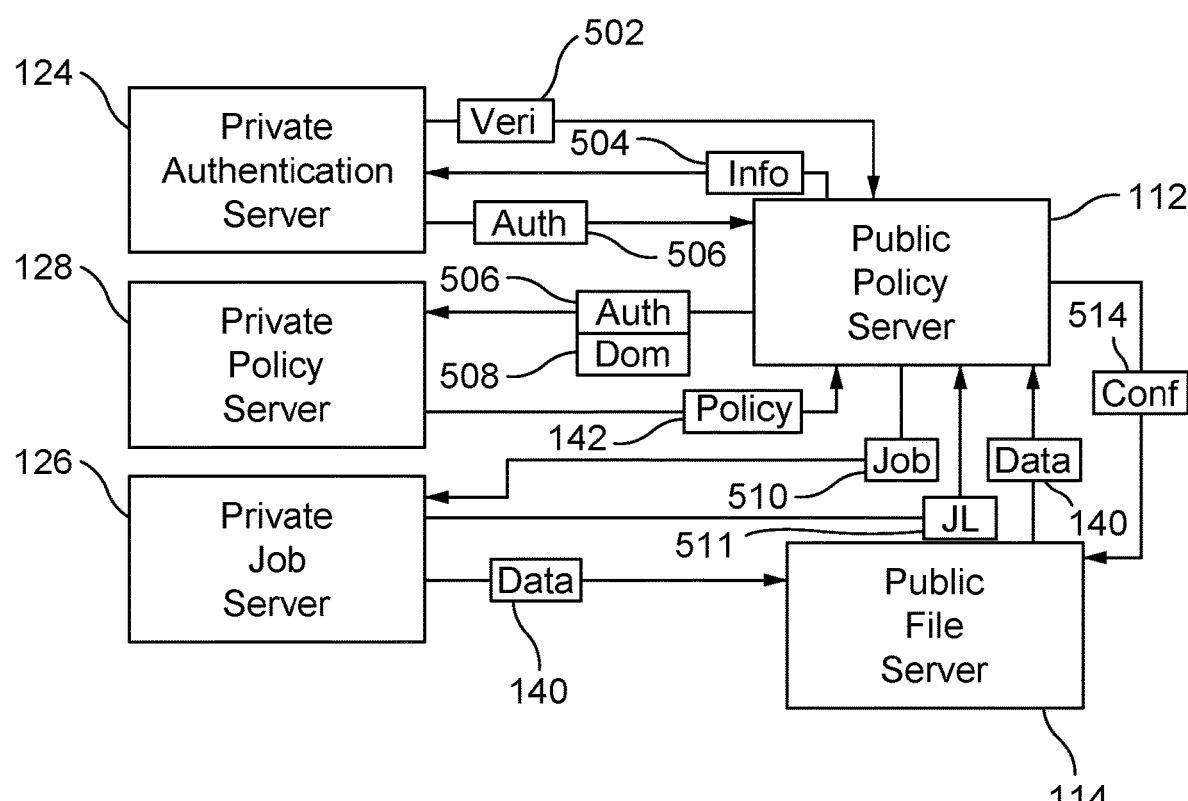
FIG. 5 illustrates a block diagram of servers and data used within the policy-based printing system according to the disclosed embodiments.

Policy 142 may be a file having flags or other information to indicate what the user can do within a public network. For example, limitations may be set as to what type of printing can be done, the number of pages may be printed, and the like. FIG. 4B depicts a block diagram of an example policy for policy 142 according to the disclosed embodiments.

Policy 142 may include policy information 448. Policy information 448 may include a title of the policy, document information, and private domain information. Policy 142 includes data, such as flags, that indicates what can and cannot be performed in public domain 110. This data may be known as parameters in policy 142. Examples of parameters that limit printing operations are shown in FIG. 4B. Print parameter 449 may be set to indicate whether a user can even print outside private domain 120. Certain users may not be allowed to print in a public domain. Print parameter 449 may be set to limit these users to scanning documents only or other operations that do not allow access to any documents or information stored in private domain 120.

Color parameter 450 may indicate whether the user can do color printing in public domain 110. If no, then the user may be limited to only black and write printing. The user may be allowed to do color printing at printing devices in private domain 120 but not allowed to do so in a public domain setting.

Pages parameter 452 may set a limit on the number of pages that a user can print. The administrators of private domain 120 do not want unlimited printing to occur outside the private domain. Pages parameter 452 may limit the number of pages printed per day, week, month, hour, year, and the like. Alternatively, pages parameter 452 may cap the number of pages printed to have the user check with the administrators of public domain 120 to reset this parameter. Once the user hits a limit, he/she requests that the number of pages printed be reset to allow further operations. Costs parameter 454 may be similar to pages parameter 452 except to limit the amount of fees that the user may incur before printing is stopped. Costs parameter 454 helps prevent the user from running up large bills at a convenience store. It also may cap the amount of costs incurred on a periodic basis or as a total cost.

Security level parameter 456 may indicate that the user can only access documents from a job list provided from private job server 126 having a certain security or access level. Security level parameter 456 may help prevent accidental or intentional printing of sensitive documents at printing device 104. Further, the user may have access to sensitive documents when printing within private domain 120 but not so when printing using public domain 110. Policy 142 may limit exposure to such documents.

Location parameter 458 may indicate whether the user can print at certain locations. Policy 142 may place geographic or other limitations on where the user can print using a public domain. Location parameter 458 also may indicate the type of locations to allow printing operations. For example, the administrators of private domain 120 may not allow printing in a convenience store but may allow printing in a library. Device parameter 460 may act similar to location parameter 458 except limit printing on certain devices. For example, policy 142 may not allow printing on a printing device 104 that does not have legal sized paper capability or stores the data from the job file in a memory on the device. Device parameter 460 also may limit printing operations to known printing devices having a serial number or IP address.

Operation 322 executes by providing policy 142 to public policy server 112. Public policy server 112 may configure policy 142 to determine whether the user can print using public domain 110 and what limits on the printing operations may be enforced. Policy 142 may apply to all users of private domain 120. Alternatively, policy 142 may treat users differently. Some users may have unlimited printing privileges according to parameters 452 or 454 while others are prevented from exceeding a cap set forth by these parameters. Public policy server 112 configures the determinations using policy 142 accordingly.

Using the parameters within policy 142, operation 324 executes by getting a job list from private job server 126. Public policy server 112 may generate a job token 510. Job token 510 is presented to private job server 126 to obtain a job list 511 of print jobs available to the user. In some embodiments, job token 510 may include data that specifies what print jobs can be added to job list 511 based on the parameters set forth in policy 146. Job list 511 includes those print jobs that meet the specifications of policy 146. For example, color print jobs will not be included in job list 511 of policy 146 does not allow color printing for the user in a public domain. Action 326 executes by generating job list 511 in response to job token 510. Operation 322 executes by sending the print jobs in job list 511 to public policy server 112 from private job server 126.

The user then may select a print job from job list 511. The user may select from an interface provided on printing device 104 that is then communicated to public policy server 112. Alternatively, an application may execute on a device of the user that presents the job list and allows for selection from the list. The selection is sent to public policy server 112. Operation 330 executes by sending a command to private job server 126 to prepare a selected print job along with a uniform resource locator (URL) address from public policy server 112. The URL address is one associate with public policy server 112 and accessible from public domain 110.

Action 332 executes by retrieving and preparing the data for the print job. Preferably, the data is binary data that represents the document for the print job. This may be shown as binary data 140 in FIGS. 1 and 5. Action 332 also may convert the data into a format compatible with printing device 104. For example, the document may include data that calls for printing on a legal sized paper while printing device 104 only prints using letter sized paper. The data sent from private job server 126 may be modified to fit onto a letter sized paper.

Operation 334 executes by uploading binary data 140 to the URL address provided in operation 330. Thus, private job server 126 puts the data for the print job outside private domain 120 for the first time at this point. The URL address may be valid for only a specified period of time, such as two hours, one day, a week, and the like. After that point, the URL address may expire. The URL address to download binary data 140 for the print job is provided to public file server 114.

Public policy server 112 now retrieves binary data 140 and sends the data to printing device 104. Before that occurs, however, the disclosed embodiments may confirm whether the user has enough funds to pay for processing and completing the print job. Operation 336 executes by generating a confirmation token 514 at public policy server 112 once it is confirmed that the user or user's account has enough money to cover expenses to print. Public policy server 112 may compare the funds available to the cost to complete the print job. If there are enough funds, then confirmation token 514 is generated and sent to public file server 114. If not, then the user may be alerted to add more funds to his/her account.

Action 338 executes by obtaining uploaded binary data 140 from the URL address. Public file server 114 may send a call to the URL address which then sends binary data 140 to the public file server. Public file server 114 may store binary data 140 until confirmation token 514 is received. If a confirmation token 514 is not received within a specified time frame, then binary data 140 may be deleted from public file server 114. This feature prevents print jobs from private domain 120 from being stored indefinitely in public domain 110. Other factors may be used to determine when to delete any stored files of binary data.

Operation 340 executes by sending binary data 140 for the print job from public file server 114 to public policy server 112. Operation 342 executes by sending binary data 140 from public policy server 112 to printing device 104. Printing device 104 may process the print job accordingly. The user's account for printing on public domain 110 may be charged accordingly as well. In some embodiments, public file server 114 may send binary data 140 to printing device 104.

The disclosed embodiments allow a private domain, or network, to print to a public domain using a policy applicable to the public domain. Internal policies to the private domain are not material to printing in the public domain. Further, job data is kept private as long as possible. The data for the print job is provided to the public domain when requested by the user and approved according to the policy. This feature allows the user to print anywhere. The print job is not automatically sent outside the private domain or from the private servers until printing actually occurs. The disclosed embodiments provide greater flexibility for companies and users to access documents in a secure, private location and use devices and resources in a public setting.

Figure 6:
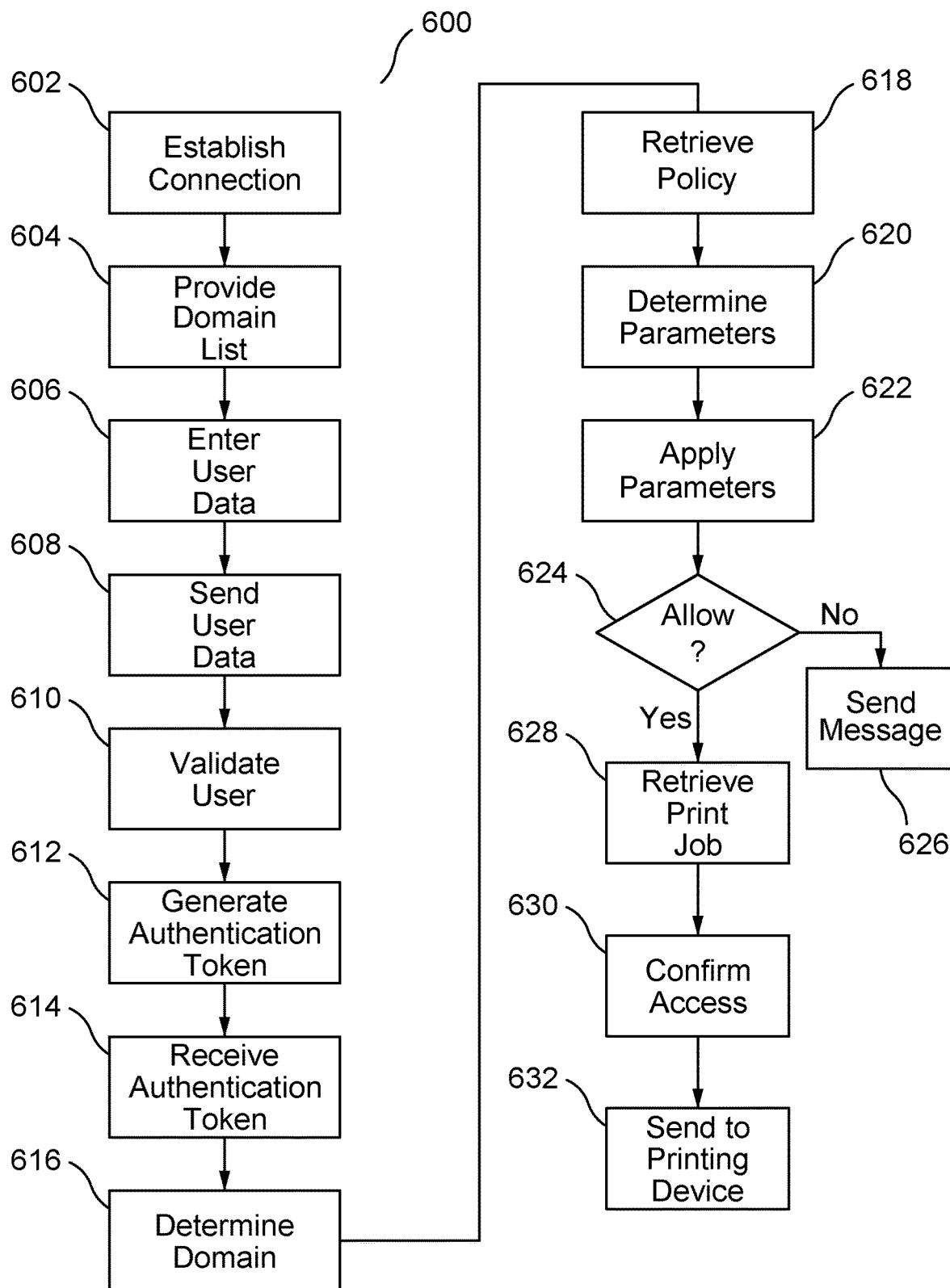
FIG. 6 illustrates a flowchart for printing at a printing device within the policy-based printing system according to the disclosed embodiments.

FIG. 6 illustrates a flowchart 600 for printing at printing device 104 within policy-based printing system 100 according to the disclosed embodiments. Flowchart 600 may refer back to elements disclosed in FIGS. 1-5 for illustrative purposes. The embodiments disclosed by flowchart 600, however, are not limited to the features disclosed in FIGS. 1-5. Further, flowchart 600 may compliment the embodiments disclosed by flow diagram 300.

Step 602 executes by establishing a protocol connection 144 between private authentication server 124 and public policy server 112. The protocol connection allows communication between the servers, one in private domain 120 and another one in public domain 110. Step 604 executes by providing a domain list 146 from private authentication server 124 to public policy server 112. Domain list 146 may include applicable private domains and associated email domains that are accessible by public policy server 112. Step 606 executes by entering user data 504 within public network 110 and providing the data to public policy server 112. Step 608 executes by sending user data 504 to private authentication server 124.

Step 610 executes by validating the user at private authentication server 124. Private authentication server 124 checks the provided user data 504 against its stored authentication records for the user. If the user is validated, then step 612 executes by generating authentication token 506. Step 614 executes by receiving authentication token 506 at public policy server 112. Step 616 executes by determining the applicable private domain for the user according to domain list 146. Preferably, public policy server 112 uses the email address for the user to determine which private domain to access for the policy for the user.

Step 618 executes by retrieving policy 142 from private policy server 128 based on the receipt of authentication token 506 and domain 508 from public policy server 112. Private policy server 128 is identified according to the applicable domain 508 and queried by public policy server 112. Once verified, private policy server 128 sends policy 142 to public policy server 112.

Step 620 executes by determining the parameters for policy 142. This process is disclosed above. As shown in FIG. 4B, policy 142 may include parameters that outline what printing options are available to the user. Step 622 executes by applying the parameters to configure public policy server 112 to determine what print jobs or operations are available to the user in public domain 110.

Step 624 executes by determining whether the user is allowed to access printing device 104 using public domain 110 according to the policy. Further, step 624 determines what print jobs are available to the user according to policy 142. The determination also may include reviewing policy 142 for allowing other operations on printing device 104 such as scanning, editing, faxing, and the like. If no, then step 626 executes by sending a message to the user or public policy server 112 that the operation on printing device 104 is not allowed.

If step 624 is yes, then step 628 executes by retrieving the print job from private job server 126. A job list 511 may be provided. The print job is selected from job list 511. Job token 510 is generated by public policy server 112. Public policy server 112 sends job token 510 to private job server 126 to obtain job list 511. Upon selection of the print job, private job server 126 uploads binary data 140 for the print job to a location accessible by public file server 114. Step 630 executes by confirming access to binary data 140 for the print job by checking to see if the user has enough money to pay for using printing device 104. Other restrictions also may be checked, such as time of day, location, and the like, to confirm whether the print job should be released to printing device 104.

Step 632 executes by sending binary data 140 to printing device 104 upon confirmation in step 630. Public policy server 112 generates a confirmation token 514 to confirm that the user is allowed to print. Public policy server 112 may send confirmation token 514 to public file server 114. Upon receipt of the confirmation token, public file server 114 may forward binary data 140 for the print job to public policy server 112, which provides the data file to printing device 104.

Figure 7:
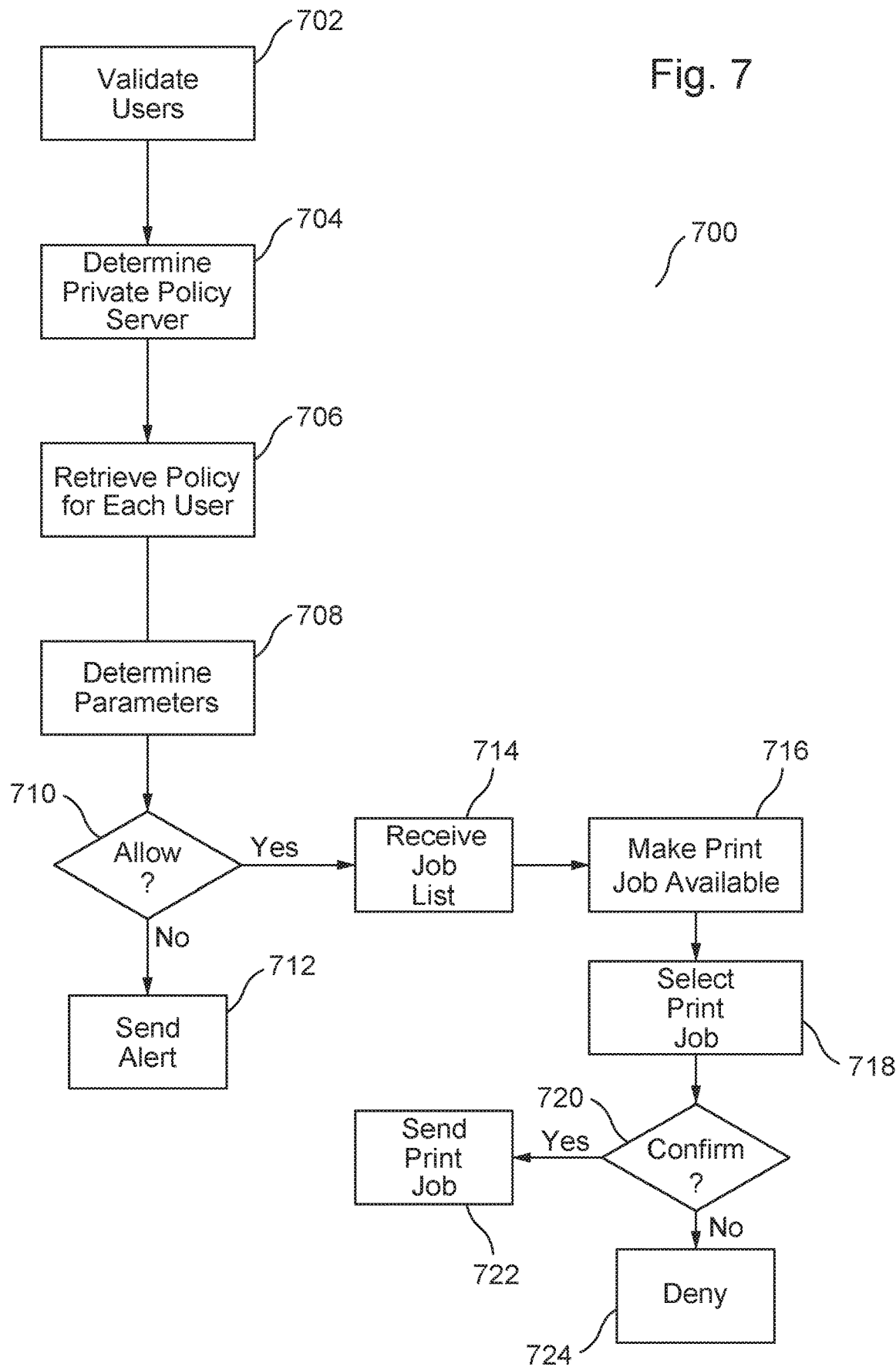
FIG. 7 illustrates a flowchart for implementing a policy-based printing system in a public domain according to the disclosed embodiments.

FIG. 7 illustrates a flowchart 700 for implementing a policy-based printing system 100 in a public domain 110 according to the disclosed embodiments. Flowchart 700 may refer back to elements disclosed in FIGS. 1-5 for illustrative purposes. The embodiments disclosed by flowchart 700, however, are not limited to the features disclosed in FIGS. 1-5. Further, flowchart 700 may compliment the embodiments disclosed by flow diagram 300.

As disclosed above, public policy server 112 may interact with a plurality of private domains. Public policy server 112 may retrieve and implement more than one policy for printing or processing print jobs in public domain 110. In some embodiments, public policy server 112 may implement policies for a plurality of public domains as well. Further, a plurality of printing devices may be connected to public policy server 112. Flowchart 700 discloses some embodiments that have public policy server 112 interacting with more than one private domain.

Step 702 executes by validating users within public domain 110 at private authentication server 124. As disclosed above, a protocol connection may be established between public policy server 112 and private authentication server 124 to exchange user information to perform the validation.

Step 704 executes by determining a private policy server for each user according to a domain for the user at public policy server 112. The domains for each user are private domains. Preferably, the email domain for each user indicates the applicable private domain for that user. With two or more users, different email domains may indicate more than one private domain. Step 706 executes by retrieving a policy 142 for each user according to the respective domain from private policy server 128.

Step 708 executes by determining the parameters for each policy 142. All of the policies are received at public policy server 112. Public policy server 112 configures the treatment of printing requests for each private domain according to the corresponding policy. The policy sets forth the parameters for printing from the private domain via the public domain. For example, the parameters for one policy may only allow 100 pages to be printed per user a month from private domain 120 while the parameters for another policy may only allow 20 pages to be printed per user from private domain 130. Public policy server 112 is configured accordingly.

Step 710 executes by determining whether the user is allowed to print according to the applicable policy. If no, then step 712 executes by sending an alert to public policy server 112 or to the user. No printing operations using public domain 110 are allowed. If yes, then step 714 executes by receiving a job list according to the applicable policy from private job server 126. Step 716 executes by making the print jobs in the job list available to the user. Step 718 executes by selecting a print job from the job list. Binary data 140 for the selected print job is retrieved from private job server 126 and made available to public file server 114.

Step 720 executes by confirming whether the print job may be sent to printing device 104. Public policy server 112 confirms that the user has enough funds or credits to perform the request task on printing device 104. If yes, then step 722 executes by sending the print job as binary data 140 to printing device 104. If no, then step 724 executes by denying the print job. The user may be prompted to provide additional funds or credits to perform the requested task.

Figure 8:
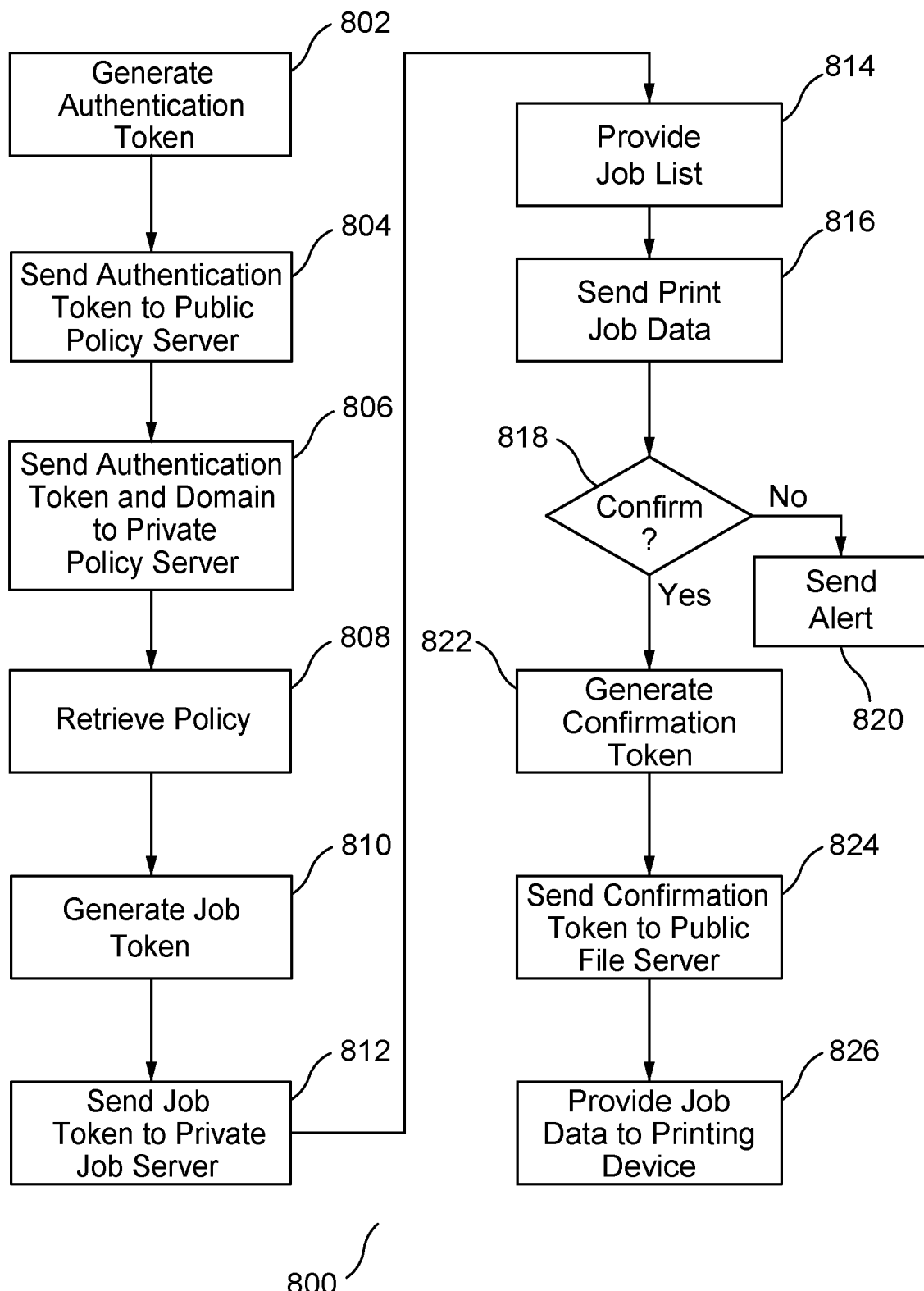
FIG. 8 illustrates a flowchart for implementing a policy-based printing system using tokens according to the disclosed embodiments.

FIG. 8 depicts a flowchart 800 for implementing a policy-based printing system 100 using tokens according to the disclosed embodiments. Flowchart 800 may refer back to elements disclosed in FIGS. 1-5 for illustrative purposes. The embodiments disclosed by flowchart 800, however, are not limited to the features disclosed in FIGS. 1-5. Further, flowchart 800 may compliment the embodiments disclosed by flow diagram 300.

Step 802 executes by generating authentication token 506 at private authentication server 124. This step occurs once private authentication server 124 validates a user attempting to print using public domain 110. Public policy server 112 sends user information 504 including an email address, username, password, or PIN to private authentication server 124. Private authentication server 124, being in private domain 120, may securely store this information for the user. The secure user information is not made available in public domain 110. Authentication token 506 indicates that the user may access private domain 120. Step 804 executes by sending authentication token 506 to public policy server 112.

Step 806 executes by sending authentication token 506 and domain 508 to private policy server 128. Public policy server 112 sends authentication token 506 and domain 508 after the domain is determined using domain list 146. An email address may indicate an email domain that is used as domain 508. Domain 508 indicates which private domain to access for the applicable policy. For example, referring to FIG. 4A, an email of user@example1.com will indicate private domain 120. Public policy server 112 attaches authentication token 506 to domain 508 and sends the request for the policy for the user.

Step 808 executes by retrieving policy 142 from private policy server 128. Authentication token 506 confirms that the user corresponds to the policy. Authentication token 506 may include data provided by private authentication server 124 that identifies the user as able to use private domain 120 and, therefore, policy 142 for the private domain should be used in printing on public domain 110. Private policy server 128 sends policy 142 to public policy server 112. Public policy server 112 then configures itself to apply the parameters of the policy to using public domain for the user.

Step 810 executes by generating job token 510 at public policy server 112 after applying the parameters of policy 142. The parameters may detail what the user can do using public domain 110. These parameters may not necessarily correspond to what the user can do using private domain 120. Limitations are placed on the user on how he/she can use printing device 104. Job token 510 may reflect the parameters to compile the job list of print jobs available to the user according to policy 142.

Step 812 executes by sending job token 510 to private job server 126. Private job server 126 may store the print jobs available to the user or to users in private domain 120. In some embodiments, a plurality of print jobs may be available such that a job list 511 is generated based on the parameters for the user in using public domain 110. Job token 510 may be used in generating job list 511 in that it includes information to select the appropriate print jobs to include in the print job list.

Step 814 executes by providing print job list 511 to public policy server 112. The user may select a print job from print job list 511. Alternatively, the desired print job may already be selected such that public policy server 112 receives data for the selection, such as from an application on a mobile device, that corresponds to the print job in job list 511. Public policy server 112 then requests the print job data from private job server 126. Step 816 executes by sending job binary data 140 for the selected print job from private job server 126 to public file server 114.

Step 818 executes by confirming whether the user may print or process the print job at printing device 104. For example, public policy server 112 may confirm that the user has enough funds in an account to pay for printing on printing device 104. If step 818 is no, then step 820 executes by sending an alert to the user or to public policy server 112 that printing operations are to be stopped until the condition is met. Using the above example, the user may be asked to provide additional funds to his/her account to print the document.

If step 818 is yes, then step 822 executes by generating confirmation token 514 by public policy server 112. Confirmation token 514 indicates that the processing of binary data 140 at printing device 104 may proceed. Step 824 executes by sending confirmation token 514 to public file server 114 to obtain binary data 140, which is stored thereon. Public file server 114 may send binary data 140 to public policy server 112 upon receipt of confirmation token 514.

Step 826 executes by providing binary data 140 to printing device 104. Public policy server 112 may send binary data 140 once a connection is established with printing device 104. Public policy server 112 may have to wait until printing device 104 is available before forwarding binary data 140. Thus, the data from private job server 126 is not made available on printing device 104 until the operations are ready to commence. Although the current embodiments discuss printing on printing device 104, other operations also may occur, such as scanning, editing, faxing, and the like.

Figure 9:
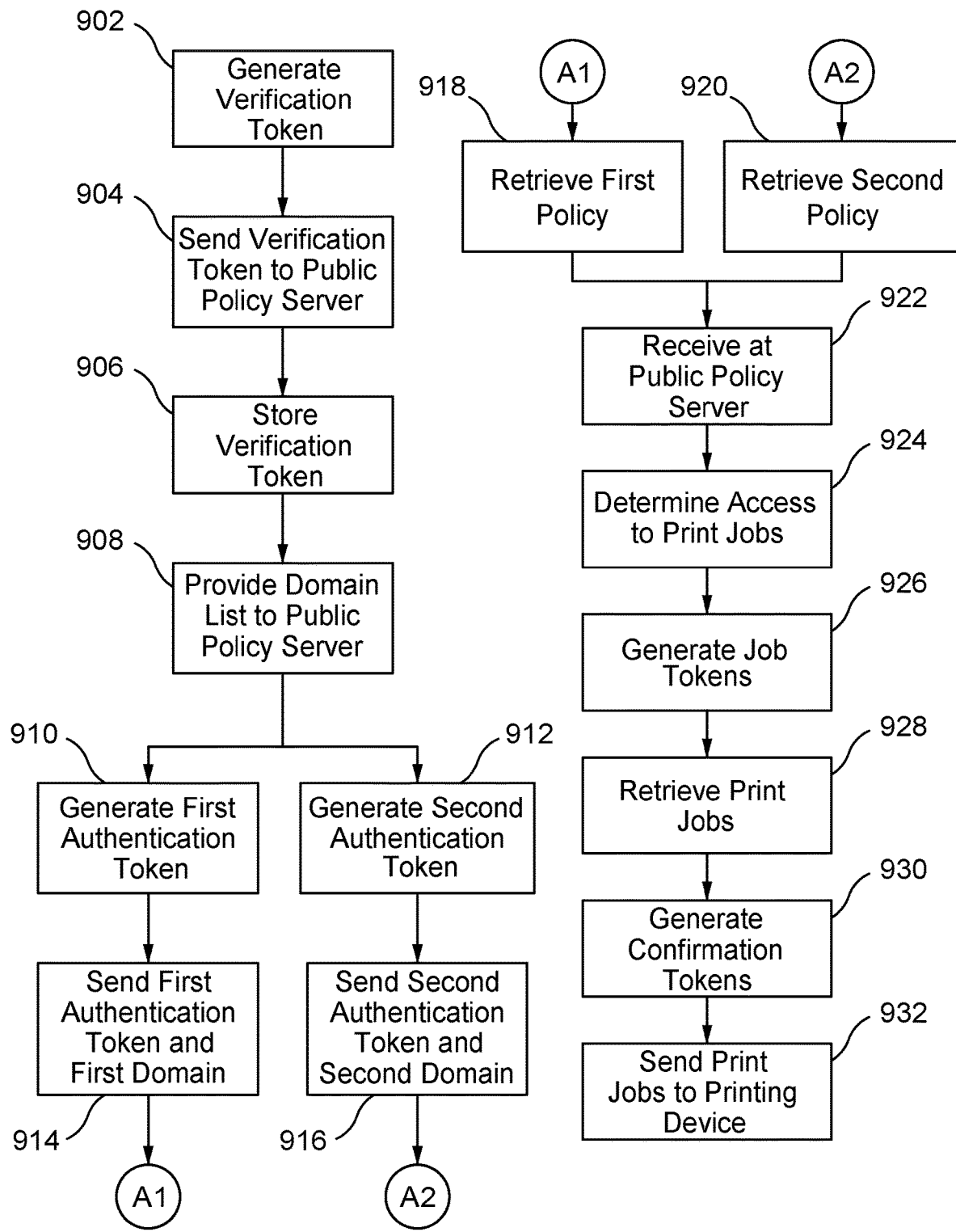
FIG. 9 illustrates a flowchart for selecting a plurality of print jobs from a plurality of private domains for printing in a public domain according to the disclosed embodiments.

FIG. 9 depicts a flowchart 900 for selecting a plurality of print jobs from a plurality of private domains 120 and 130 for printing in public domain 110 according to the disclosed embodiments. Flowchart 900 may refer back to elements disclosed in FIGS. 1-5 for illustrative purposes. The embodiments disclosed by flowchart 900, however, are not limited to the features disclosed in FIGS. 1-5. Further, flowchart 900 may compliment the embodiments disclosed by flow diagram 300.

As disclosed above, different policies apply to different to users and prints jobs from different private domains. One private domain may not allow color printing while another private domain may not allow unlimited printing. Thus, public policy server 112 configures itself to resolve the different requirements set forth in a plurality of policies from various private policy servers. Further, public policy server 112 may manage different job lists and print jobs from the plurality of private domains. Alternatively, a private domain may have different domains related to it, such as example1.com and example2.com for private domain 120 shown in FIG. 4A. Different policies may come from a single private policy server.

Step 902 executes by generating verification token 502 at private authentication server 124. Private authentication server 124 receives information about public policy server 112 in order to establish a protocol connection. Verification token 502 helps to establish a connection between private authentication server 124 and public policy server 112. Private authentication server 134 also may generate a verification token 502 to establish protocol connection to public policy server 112.

Step 904 executes by sending verification token 502 to public policy server 112. Step 906 executes by storing verification token 502 at public policy server 112. As long as public policy server 112 can present verification token 502 when requested or when submitting a print request for a user, the connection is established with private authentication server 124. Step 908 executes by providing domain list 146 from private authentication server 124 to public policy server 112. Domain list 146 may include information pertaining to a plurality of domains for a plurality of private domains, as disclosed by FIG. 4A.

Step 910 executes by generating a first authentication token 506. Step 912 executes by generating a second authentication token 506. The first authentication token may be generated in response to a first user providing user information at public policy server 112. The second authentication token may be generated in response to a second user providing user information at public policy server 112. Public policy server 112 may access the appropriate private authentication server to validate the user information for each user. In some embodiments, private authentication server 124 may validate both users and generate both authentication tokens. Alternatively, private authentication server 124 may generate the first authentication token while private authentication server 134 may generate the second authentication token. Public policy server 112 may have instructions when to use the different private authentication servers.

Step 914 executes by sending the first authentication token and a first domain to a first private policy server. Step 916 executes by sending the second authentication token and a second domain to a second policy server. Public policy server 112 determines which private domain is applicable to each user. The determination of the private domain may be based on the email address for each user. In some embodiments, public policy server 112 may send this data to a single private policy server, which stores different policies for different domains that use a single private domain. Alternatively, the authentication tokens and domains may be sent to separate private policy servers. For example, the first authentication token and first domain are sent to a first private policy server, such as private policy server 128. The second authentication token and the second domain are sent to a second private policy server, such as private policy server 138.

Flowchart 900 proceeds to steps A1 and A2 for steps 914 and 916, respectively. Steps A1 and A2 then proceed to steps 918 and 920, respectively. Step 918 executes by retrieving a first policy, such as policy 142, in response to the first authentication token and the first domain. Step 920 executes by retrieving a second policy, such as policy 142, in response to the second authentication token and the second domain. In some embodiments, the first policy is stored on private policy server 128 and the second policy is stored on private policy server 138. Alternatively, both policies may be stored on private policy server 128 or 138. The first policy may apply to the first user and the second policy may apply to the second user.

Step 922 executes by receiving the first and second policies at public policy server 112. Step 924 executes by determining access to a first print job according to the first policy and access to a second print job according to the second policy. Public policy server 112 may configure the parameters of each policy to determine what type of print jobs may be made available to each user. For example, the first print job may not be available to the second user according to the second policy. The determination of access may relate to what print jobs are available to the users over public domain 110.

Step 926 executes by generating first and second job tokens, such as job token 510, based on the first and second policies at public policy server 112. A first job token is generated for the first policy and a second job token for the second policy. In some embodiments, the first job token may be sent to private job server 126 and the second job token may be sent to private job server 136. The different private job servers are in separate private domains. Alternatively, the job tokens may be sent to private job server 126 or 136.

Step 928 executes by retrieving a first job list, such as job list 511, based on the first policy and the received first job token and retrieving the second job list, such as job list 511, based on the second policy and the received second job token. The applicable private job server or servers provide the job lists to public policy server 112. The first user may select a first print job from the first print job list. The second user may select a second print job from the second print job list. These requests are communicated back to the application private job server or servers. The binary data for the first and second print jobs are sent to public file server 114.

Step 930 executes by generating confirmation tokens, such as confirmation token 514, at public policy server 112 to indicate that the print jobs may be processed at printing device 104. Public policy server 112 may confirm that each user has enough funds in his/her account to perform operations on printing device 104, as disclosed above. A first confirmation token for the first print job is presented to public file server 114. A second confirmation token for the second print job is presented to public file server 114. Public file server 114 provides the binary data for each print job to public policy server 112. Step 932 executes by sending the binary data for the first and second print jobs to printing device 104.

Figure 10:
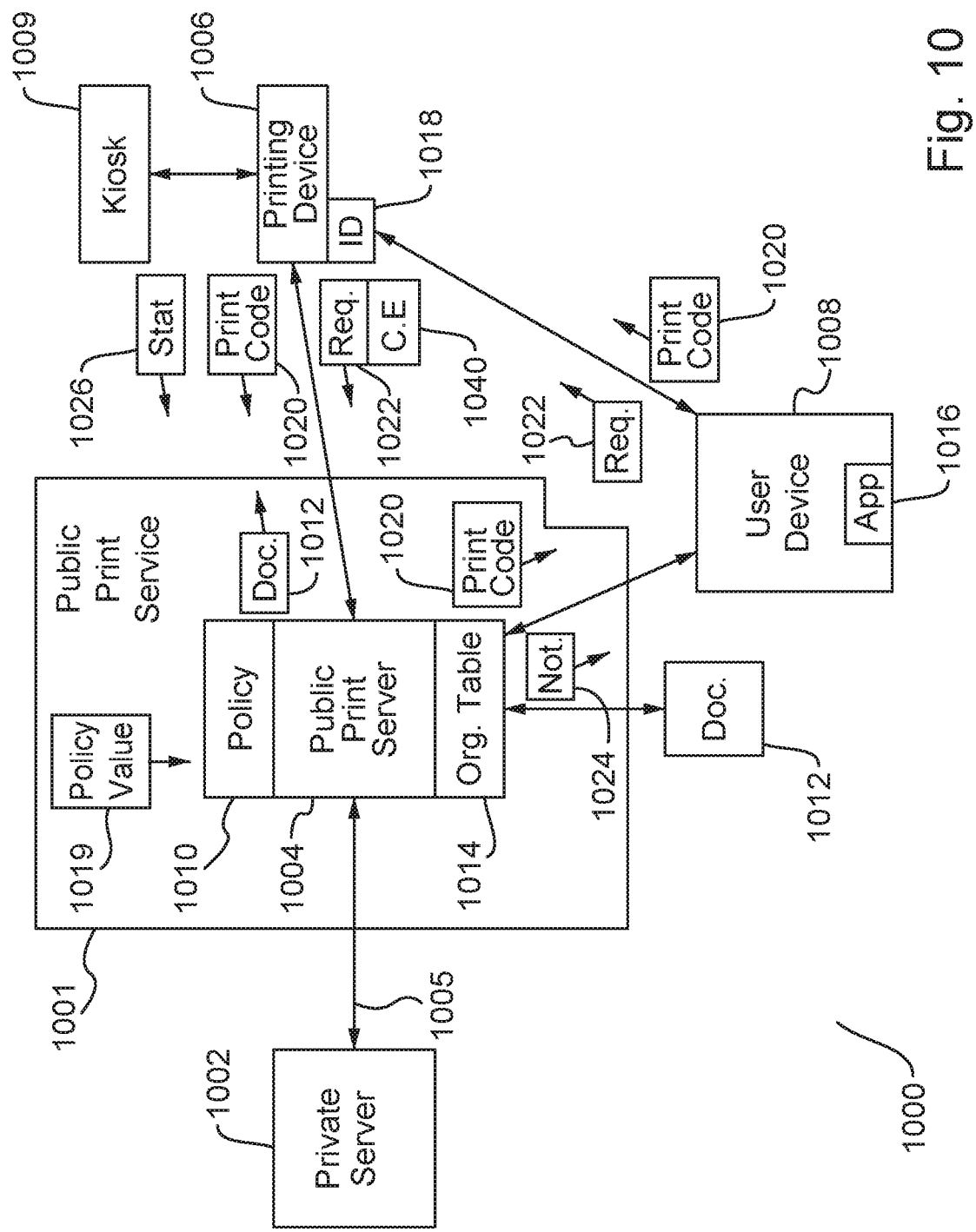
FIG. 10 illustrates a policy-based system to implement printing operations using a public print server according to the disclosed embodiments.

FIG. 10A depicts a policy-based system 1000 to implement printing operations using a public print server 1004 through a public print service 1001 according to the disclosed embodiments. Policy-based system 1000 may differ from system 100 disclosed above as most of the printing operations, if not all, are performed in the public domain. System 1000 uses a public print server 1004 to manage and approve printing operations on printing devices. Further, the policy and its terms may be applied on an organizational level as opposed to a user.

Public print server 1004 may be used to implement a public print service 1001. A user may be required to pay every time that he/she prints a document on a public printing device. Public print service 1001 may support a "one-time payment for corporate" system where a service provider will charge print costs and fees to companies periodically, such as once a month. This feature allows the user to not pay for printing every time he/she prints a document in the public domain. Companies, however, may not have any idea how much is being charged to their accounts by such public print services. The monthly invoices could become quite costly. Thus, some companies may be interested in managing costs at the printing device using a public print service platform.

In some embodiments, public print service 1001 is a cloud-based network. Public print server 1004 may be a cloud-based server. Network communication and interconnectivity between components within public print service 1001 are done within a cloud computing infrastructure. This feature enables cloud computing operations to interact and perform network connection with other resources on the cloud. Public print service 1001 may be a public cloud service in that it shares computing services among different customers. Each customer's data and applications, including documents and print services, running in the cloud remain hidden from other customers. Public print server 1004 may be a virtual server running in the cloud-based computing environment of public print service 1001. Public print server 1004 may be accessed remotely.

System 1000 includes printing device 1006 connected to public print server 1004 within public print service 1001. System 1000 also includes a private server 1002. Private server 1002 may be connected to public print server 1004 over websocket connection 1005 and within a private domain, as disclosed above. For normal printing operations, public print server 1004 does not communicate with private server for every print job. Instead, public print server 1004 determines whether to allow the print job based on information stored in organization table 1014 and policy 1010. A copy of policy 1010 may be available on private server 1002. For example, public print server 1004 may download policy 1010 from private server 1002. Organization table 1014 is disclosed in greater by FIG. 11 below.

A user may access printing device 1006. In some embodiments, the user uses user device 1008 having mobile application 1016 to manage and request print jobs from public print server 1004. As disclosed below, references to the "user" also may include user device 1008. User device 1008 may be a mobile phone, tablet, laptop, and the like. Mobile application 1016 may send and receive data from printing device 1006 and public print server 1004 regarding printing operations within system 1000.

In other embodiments, the user may use kiosk 1009, which is connected to printing device 1006. Kiosk 1009 may allow the user to manage print jobs and make selections. It also may allow the user to pay for print jobs on printing device 1006. Kiosk 1009 also may send and receive data from mobile application 1016. Printing device 1006 may include device identification 1018, which uniquely identifies the printing device within system 1000. When sending data to printing device 1006, user device 1008 and public print server 1004 may identify the printing device using device identification 1018. In some embodiments, device identification 1018 may be an IP address.

The user may upload document 1012 to public print server 1004. In some embodiments, document 1012 is an electronic document or image file of an actual document. It also may be a document created using a computer-based application, such as a word processor, and stored on a device accessible by the user. For example, document 1012 may be stored on user device 1008 and sent to public print server 1004. Alternatively, document 1012 may be a scanned document file. Public print server 1004 stores document 1012. Public print server 1004 also may access documents within public print server 1001 to make the documents available for printing operations.

Public print server 1004 generates a print code 1020 for document 1012. Print code 1020 may be used to retrieve document 1012 when presented to public print server 1004 by a device within public print server 1001. Print code 1020 may be an alphanumeric code, personal identification number (PIN), graphical code, and the like. Public print server 1004 may store this relationship in organization table 1014. It also provides print code 1020 to the user. In some embodiments, public print server 1004 sends print code 1020 to user device 1008. Mobile application 1016 may receive the code and display it to the user. The user inputs print code 1020 into printing device 1006 to print document 1012.

Public print server 1004 also stores information and data used to determine whether the user can print document 1012. A service provider may host printing operations for several companies, or organizations. The service provider may manage private policy server 1002 to set policies for each organization that uses public printing. For example, policy 1010 may be applied to determine a policy credit value 1019. Policy credit value 1019 is the maximum amount that can be charged to an organization for printing costs during a policy period. For example, organization ABC may set a limit for print jobs using a public print service to $100 per week. The limit is provided to public print server as policy credit value 1020. As different policies may apply to different organizations, organization table 1014 may be used to store and track policy credit values. The service provider may modify policies within public print service 1001 to update the maximum values for public printing. Thus, public print server 1004 may update organization table 1014 periodically with policy credit values 1019.

When the user wants to print document 1012, he/she may generate a request 1022. Request 1022 is received at printing device 1006. Request 1022 requests permission to print document 1012, which is associated with an organization in organization table 1014. The user may enter the request on printing device 1006 or kiosk 1009. Alternatively, the user may use user device 1008 to send request 1022 electronically to printing device 1006 or kiosk 1009. Printing device 1006 passes request 1022 to public print server 1004. In other embodiments, request 1022 may be sent directly to public print server 1004 from user device 1008.

Public print server 1004 then determines whether enough credit is left on the account for the organization to print document 1012. This process is disclosed in greater detail below. Policy credit value 1022 is used to determine a remaining credit value for the organization. Organization table 1014 may store transactions for the policy period and reduce the remaining credit value in accordance with the cost of each transaction. Thus, as the policy period transpires, the remaining credit value should decrease with print jobs using the public printing service.

Printing device 1006 may determine how much the print job for document 1012 should cost. It may send this amount along with request 1022 to public print server 1004. Public print server 1004 determines whether there is enough remaining credit value to pay for the print job at printing device 1006. For example, an estimated cost value 1040 for printing document 1012 may be determined. Public print server 1004 compares estimated cost value 1040 to the remaining credit value in organization table 1014. If estimated cost value 1040 is less than the remaining credit value for the organization, then notification 1024 is sent from public print server 1004 to the user, or to user device 1008. If it is not, then printing operations are cancelled. Public print server 1004 also may send the result of the determination to printing device 1006 to let it know that print code 1020 may be entered.

The user enters print code 1020. In some embodiments, the code for print code 1020 may be entered or provided directly to printing device 1006 or kiosk 1009. In other embodiments, mobile application 1016 may forward data for print code 1020 to printing device 1006. Printing device 1006 forwards print code 1020 received thereon to public print server 1004. After verifying print code 1020, public print server 1020 retrieves the associated document and sends it to printing device 1006.

Printing device 1006 prints document 1012. In some embodiments, document 1012 may be sent to kiosk 1009 before being provided to printing device 1006. Kiosk 1009 may allow the user to confirm document 1012 is to be printed and the costs associated therewith. After printing operations are complete, printing device 1006 may generate statistics 1026 which includes the actual cost to print the document. Statistics 1026 also may include the number of pages printed, user information, time of printing, and the like. This information is sent to public print server 1004. Public print server 1004 updates organization table 1014 accordingly and calculates the new remaining credit value as well as creates an entry for the print job.

As may be appreciated, printing operations in system 1000 are performed without the need for interaction with private server 1002. Public print service 1001 manages documents and allows print jobs using public print server 1004. Thus, there is not a need to interact or involve servers in the private domain. This feature keeps servers in the private domain separate from servers in the public domain. Further, an organization may subscribe or contract with public print service 1001 to provide printing services to users in a public domain without the need for managing and approving print jobs.

FIG. 11 depicts organization table 1014 on public print server 1004 according to the disclosed embodiments. As disclosed above, organization table 1014 is used in determining whether a print job within system 1000 may proceed. It is stored on public print server 1004. One or more organizations may be represented in organization table 1014 as the service provider using private policy server 1002 may provide printing services for multiple companies and organizations. Thus, multiple policies may be used determining whether to print documents using system 1000.

FIG. 11 shows ledgers 1101A and 1101X for Organization A and Organization X, respectively. Additional organizations may have ledgers in organization table 1014. Each organization may correspond to a policy 1010 stored on public print server 1004. In some embodiments, an administrator may set the values within organization table 1014. In other embodiments, the values are proscribed by the corresponding policy. The policy values also may be set by public print service 1001 when an account is created for the applicable organization.

Each ledger may include fields to store information related to the associated organization. Ledger 1101A includes information for Organization A. Field 1102A may include data about user(s) allowed to public print within the organization. Email addresses, user names, passwords, employee identifications, and the like also may be stored here so that public print server 1004 may verify the identity of a user when he/she tries to print within system 1000. This information also may be used to generate print code 1020 for a document uploaded to public print server 1004.

Field 1019A may correspond to the policy credit value specified for Organization A. Organization table 1014 may receive policy credit value 1019 from public print service 1001. In some embodiments, this value is set by the corresponding policy for Organization A. Thus, policy 1010 for Organization A may provide this data. The policy credit value is used to determine a remaining credit value, as stored in field 1106A (hereinafter referred to as remaining credit value 1106A). Organization table 1014 uses entries 1108A, 1110A, and 1112A to determine remaining credit value 1106A for a print job by a user within Organization A.

For example, the policy credit value for Organization A may be $100. Entry 1108A refers to a print job approved by public print server 1004 within public print service 1001 for $5. After this transaction, remaining credit value 1106A would be $95. Entries 1110A and 1112A may refer to other print jobs costing $10 and $2, respectively. These transactions reduce the remaining credit value accordingly to $83. The print jobs listed in entries 1108A, 1110A, and 1112A may not necessarily be performed on printing device 1006 but may occur anywhere in public print service 1001. When a request is received from printing device 1006 for a new print job, draft entry 1114A is used to determine whether there is enough remaining credit value 1106A to perform the print job. In this instance, the remaining credit value is $83 so the print job may be allowed. After the print job is complete, public print server 1004 receives statistics 1026 and draft entry 1114A becomes an entry into ledger 1101A. The remaining credit value is now $82.

Organization table 1014 also includes ledger 1101X for Organization X. Field 1102X may include a policy credit value of $75. Thus, policy credit values are not uniform across organizations using public print service 1001. Entries 1108X and 1110X are used to determine remaining credit value 1106X. If entry 1108X is $50 and entry 1110X is $20, then a print job request from a user within Organization X having a cost of $10 will be denied. Public print server 1004 may send notification 1024 to printing device 1006 or user device 1008 that the user may not print the document using the public print service. The user may need to pay at the point of printing instead. Alternatively, if the print job is S2, then remaining credit value 1106X will allow the printing operations.

Figure 12:
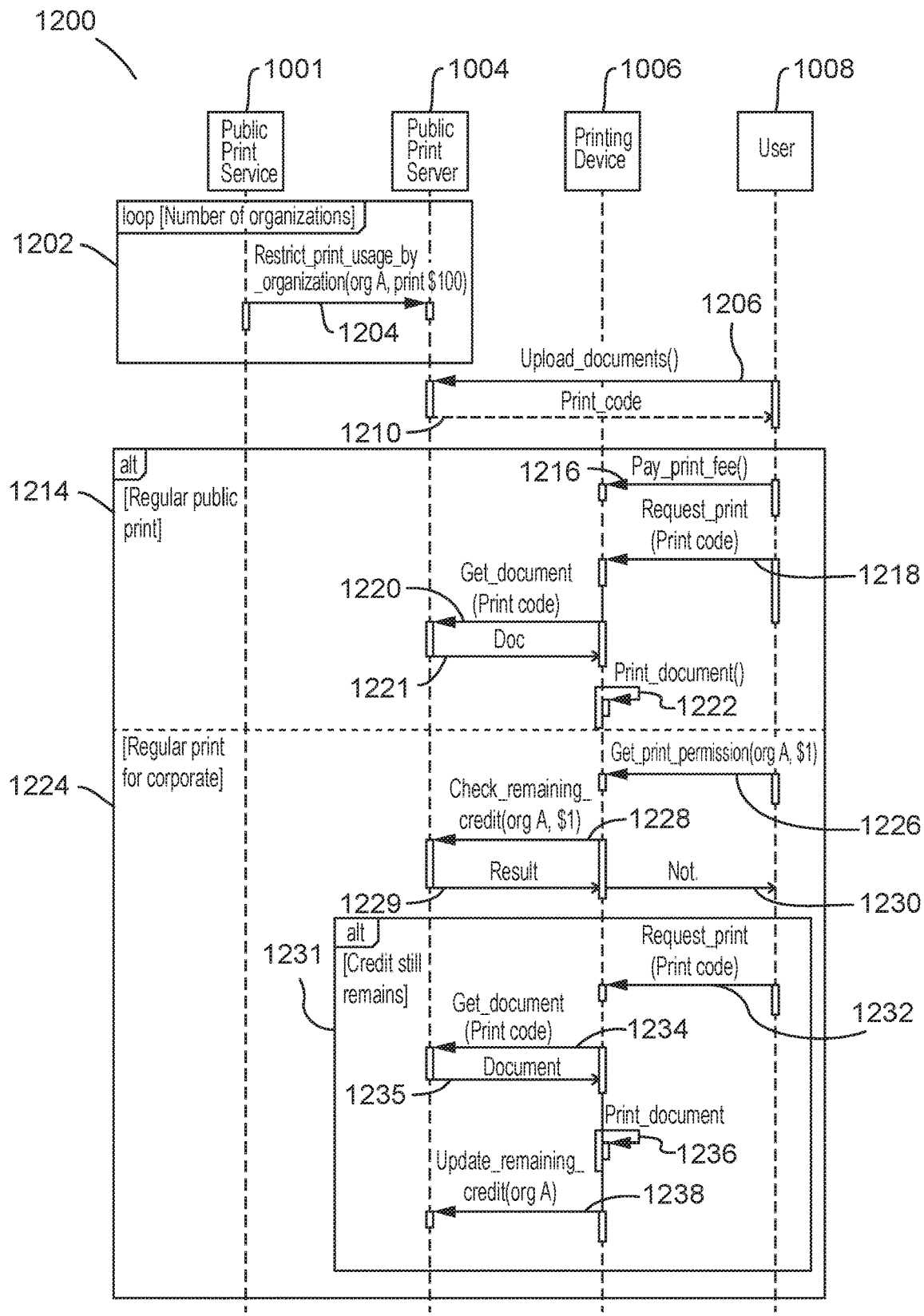
FIG. 12 illustrates a flow diagram for printing a document at a printing device in the policy-based system according to the disclosed embodiments.

FIG. 12 depicts a flow diagram 1200 for printing document 1012 at printing device 1006 in policy-based system 1000 according to the disclosed embodiments. Flow diagram 1200 may refer to FIGS. 1-11 for illustrative purposes. The embodiments disclosed by flow diagram 1200, however, are not limited to those disclosed by FIGS. 1-11.

Process 1202 relates to public print service 1001 providing the policy credit values for the organizations to public print server 1004. For example, each organization or company may have a ledger in organization table 1014. There may be any number of organizations. For each organization, operation 1204 is executed to restrict print usage by a policy credit value 1019. This value is stored in the corresponding ledger. For Organization A, the policy credit value may be S100, as shown in field 1019A. Ledger 1101A is updated accordingly. Operation 1204 is repeated until organization table 1014 includes entries for each organization.

In some embodiments, policies 1010 available on public print server 1004 may be used to generate the policy credit values. A policy 1010 for the organization sets forth the maximum print usage for a policy period and is used to generate policy credit value 1019. Operation 1204 may provide policy credit value 1019 to public print server 1004 to store in organization table 1019. Process 1202 may be performed as needed or periodically to update the policy credit values on public print server 1004 for printing operations within public print service 1001.

Operation 1206 executes by the user uploading document 1012 to public print server 1004. As disclosed above, document 1012 may be sent from another server within system 1000. It also may be scanned and uploaded to public print server 1004 or within public print service 1001. Alternatively, document 1012 may be uploaded from user device 1008. User device 1008 may capture document 1012 using mobile application 1016 and forward this file to the public print server. Public print server 1004 stores document 1012. It also may verify that the user belongs to an organization within organization table 1014 and is allowed to use the public print service.

Operation 1210 executes by generating print code 1020 at public print server 1004 and sending it to the user. In some embodiments, print code 1020 may be received at user device 1008 by mobile application 1016. The user may use print code 1020 to print document 1012 within system 1000. Print code 1020 is uniquely assigned to document 1012 to prevent the printing of other documents not available to the user.

Process 1214 relates to the operations to print document 1012 using regular printing operations. Operation 1216 executes by paying the print fee by the user at printing device 1006 or kiosk 1009. Operation 1218 executes by the user entering or sending print code 1020 to printing device 1006 or kiosk 1009. Mobile application 1016 may send print code 1020 to printing device 1006 or kiosk 1009. Operation 1220 executes by getting document 1012 using print code 1020. Printing device 1006 forwards print code 1020 to public print server 1004. Public print server 1004 matches print code 1020 to document 1012. It also may verify that the user can print the document according to any applicable policy. Operation 1221 executes by providing document 1012 to printing device 1006 from public print server 1004. Operation 1222 executes by printing document 1012 at printing device 1006. As the user paid for the print operations in operation 1216, process 1214 may be complete.

Process 1224 relates to printing a document using the public print service for the organization of the user. Process 1224 uses the information stored on public print server 1004 to determine whether the user can print the document without having to pay at the printing device, such as done in process 1214. Operation 1226 executes by submitting a permission request to print document 1012 on printing device 1006. The user may generate and submit the request on printing device 1006 or kiosk 1009. Alternatively, the user may submit the request using mobile application 1016 on user device 1008. The user may select a document from a list or menu and submit the request to printing device 1006. Printing device 1006 or kiosk 1009 may calculate an estimated cost for the print job of document 1012.

Operation 1228 executes by sending the request and the estimated cost for the print job from printing device 1006 or kiosk 1009 to public print server 1004. Public print server 1004 then compares the estimated cost for the print job to the remaining credit value. If the user is within Organization A, then public print server 1004 uses remaining credit value 1106A based on policy credit value 1019A to determine whether the print job is allowed. If enough credit remains for Organization A, then public print server 1004 allows document 1012 to be printed.

Operation 1229 executes by sending the result of the determination to printing device 1006 or kiosk 1009 from public print server 1004. The result may indicate that the print job is allowed. Operation 1230 executes by sending notification 1024 to the user that the print job is allowed. In some embodiments, notification 1024 is received at mobile application 1016 on user device 1008. The user may be prompted by user device 1008 to initiate the print job for the requested document. Notification 1024 may be sent by public print server 1004 or printing device 1006.

Sub-process 1231 of process 1224 relates to printing document 1012 after receiving approval from public print server 1004. Operation 1232 executes by sending request 1022 to printing device 1006 or kiosk 1009. In some embodiments, the user enters print code 1020 into printing device 1006 or kiosk 1009. The user inputs the code using an operations panel or other input device. Alternatively, print code 1020 may be sent electronically from user device 1008 using mobile application 1016. Request 1022 may include print code 1020.

Operation 1234 executes by sending print code 1020 to public print server 1004, much like operation 1220 disclosed above. Print code 1020 is used to retrieve document 1012 on public print server 1004. Operation 1235 executes by sending document 1012 to printing device 1006 or kiosk 1009. Operation 1236 executes by printing document 1012 at printing device 1006. The user may pick up the printed document and confirm receipt using the printing device or the kiosk, or the mobile application on user device 1008.

Operation 1238 executes by updating organization table 1014 with statistics 1026 generated by printing device 1006. Printing device 1006 may determine the final cost for the print job of document 1012 as well as other information. Statistics 1026 may be sent electronically to public print server 1004. An entry is created in the appropriate ledger to reflect the transaction and adjust the remaining credit value for the organization. Statistics 1026 also may be sent to the user through mobile application 1016. In some embodiments, statistics 1026 may be sent to private policy server 1002 for tracking costs and information by the service provider.

Figure 13:
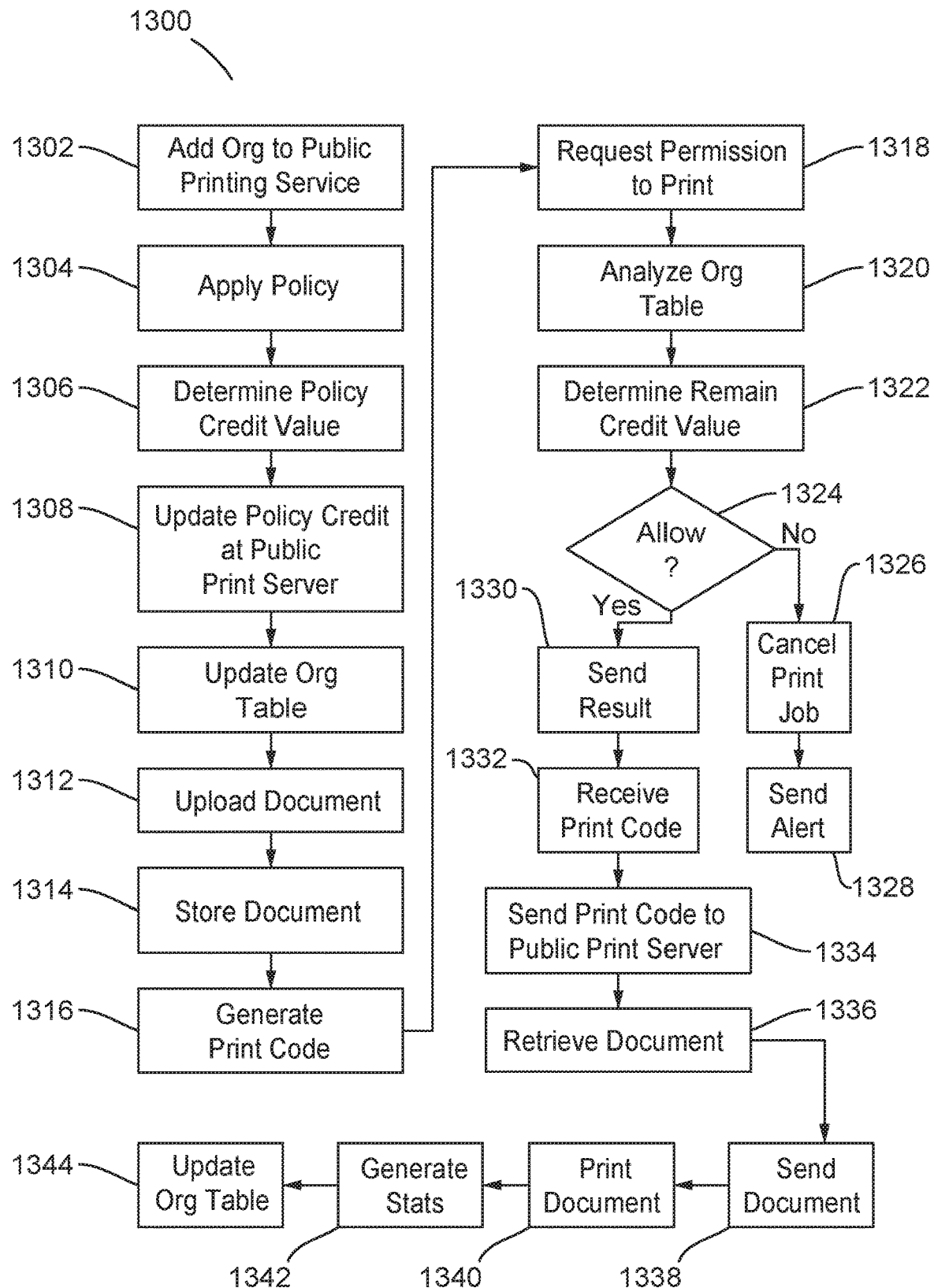
FIG. 13 illustrates a flowchart for using the printing device and a public print server to print a document in the policy-based system according to the disclosed embodiments.

FIG. 13 depicts a flowchart 1300 for using printing device 1006 and public print server 1004 to print document 1012 in policy-based system 1000 according to the disclosed embodiments. Flowchart 1300 may refer to FIGS. 1-12 for illustrative purposes. Flowchart 1300, however, is not limited to the embodiments disclosed by FIGS. 1-12.

Step 1302 executes by adding an organization to public printing service 1001 provided by a service provider. In some embodiments, the organization may subscribe to public printing service 1001 to allow its employees to print in the public domain and at printing devices outside the corporate structure. Step 1304 executes by applying policy 1010 to determine the print usage restrictions for the organization. One of the restrictions may be the maximum amount that users may charge for public printing on devices outside the organization. Policy 1010 sets forth this maximum amount for a policy period. After the policy period is complete, the maximum amount may be reapplied to restrict print usage.

Step 1306 executes by determining policy credit value 1019 according to policy 1010. Policy credit value 1019 may be the maximum amount to be charged for the policy period. In other embodiments, policy credit value 1019 may be an amount that, when used through printing operations using public print service 1001, requires the service provider to query the organization whether to continue to allow public printing and to pay more for the service. In other words, the organization may replenish the account based on anticipated printing costs. Step 1308 executes by updating policy credit value 1019 at public print server 1004, if applicable. Policy credit value 1019 may be changed during the use of public print service 1001. In some embodiments, the service provider may set policy credit value 1019 at public print server 1004 when the organization subscribes to public print service 1001.

Step 1310 executes by updating organization table 1014 with policy credit value 1019 for the organization. For example, if policy credit value 1019 pertains to Organization A, then ledger 1101A for the organization is updated or created to include this value in field 1019A. This value may be stored in organization table 1014 until updated or changed.

Step 1312 executes by uploading document 1012 to public print server 1004. This step may occur before or after steps 1302-1310 disclosed above. The user uploads an electronic document to public print server 1004 to make available to print within public print service 1001. Step 1314 executes by storing document 1012 on public print server 1004. Public print server 1004 may have an account for the user correlating to ledger 1101A for Organization A. Other documents may be stored at public print server 1004 or other servers within public print service 1001.

Step 1316 executes by generating print code 1020 for document 1012. Print code 1020 will cause public print server 1004 to identify document 1012 for print jobs when received within public print service 1001 or system 1000. As disclosed above, print code 1020 may be an alphanumeric code, graphical code, PIN, and the like. Print code 1020 is sent to the user. User device 1008 may receive print code 1020 to store and present to the user when needed. Mobile application 1016 may store print code 1020 and associate it with document 1012.

Step 1318 executes by requesting permission to print document at printing device 1006 by the user. When the user is ready to print using public print service 1001, he/she may select a printing device 1006 at a location. The user may enter authentication information such as a user name, password, employee identification, and the like to generate the permission request. An estimated cost for the print job also may be determined and added to the permission request. For example, using kiosk 1009 connected to printing device 1006, the user may enter information and request that printing operations be confirmed by on the applicable organization. This information is forwarded to public print server 1004. In some embodiments, this information may be sent by user device 1008 to public print server 1004 without the need to enter it onto printing device 1006. Public print server 1004 may recognize the request coming from mobile application 1016 registered to Organization A.

Step 1320 executes by analyzing organization table 1014 to determine the values needed to approve the permission request for the print job. Public print server 1004 may use the user information to identify the appropriate ledger 1101A for Organization A. Step 1322 executes by determining the remaining credit value for Organization A using ledger 1101A in organization table 1014. Using the policy credit value, the remaining credit value is determined using entries within ledger 1101A for previous transactions to reduce the policy credit value to a current amount that is left over for printing operations. Referring to FIG. 11, remaining credit value 1106A is determined by subtracting entries 1108A, 1110A, and 1112A from policy credit value 1019A.

Step 1324 executes by determining whether to allow the print job for document 1012 according to the remaining credit value. The estimated cost to print document 1012 is compared to the remaining credit value. If it exceeds the remaining credit value, then the print job will not be allowed. If the estimated cost can be charged to Organization A, then document 1012 may be printed.

If step 1324 is no, then step 1326 executes by cancelling the print job. The permission request is denied by public print server 1004. Step 1328 executes by sending an alert to the user or to printing device 1006. The alert may be notification 1024 sent to user device 1008. Mobile application 1016 receives the notification and alerts the user. Public policy server 1004 also may send an alert to inform the service provider. The service provider then may update ledger 1101A for Organization A to increase the policy credit value.

If step 1324 is yes, then step 1330 executes by sending the result to printing device 1006 from public policy server 1004. Public policy server 1004 also may send notification 1024 to the user or user device 1008 that the print job is approved. Printing device 1006 is configured to print a document for the user. Step 1332 executes by receiving print code 1020 at printing device 1006 or kiosk 1009. As disclosed above, print code 1020 may be entered at the printing device or the kiosk. Alternatively, user device 1008 may provide print code 1020 electronically to printing device 1006 or kiosk 1009.

Step 1334 executes by sending print code 1020 to public print server 1004. Preferably, printing device 1006 sends print code 1020. In some embodiments, user device 1008 may send print code 1020 to public print server 1004. Upon receipt, public print server 1004 may verify the print code and associate it with a document stored thereon. Step 1336 executes by retrieving document 1012 associated with print code 1020. Step 1338 executes by sending document 1012 to printing device 1006 from public print server 1004. Step 1340 executes by printing document 1012 at printing device 1006.

Step 1342 executes by generating statistics 1026 for the print job. Statistics may include the number of pages printed, the actual cost for the print job, device identification 1018 for the printing device, and other information. Step 1344 executes by updating organization table 1014 with statistics

1026. Printing device 1006 sends statistics 1026 to public print server 1004. An entry may be created in the ledger for the organization and the remaining credit value updated to reflect the cost of the print job. In some embodiments, if the actual costs result in the policy credit value being exceeded, public print server 1004 may alert the service provider or public print service 1001. Further print job requests may be denied by public print server 1004.

Figure 14:
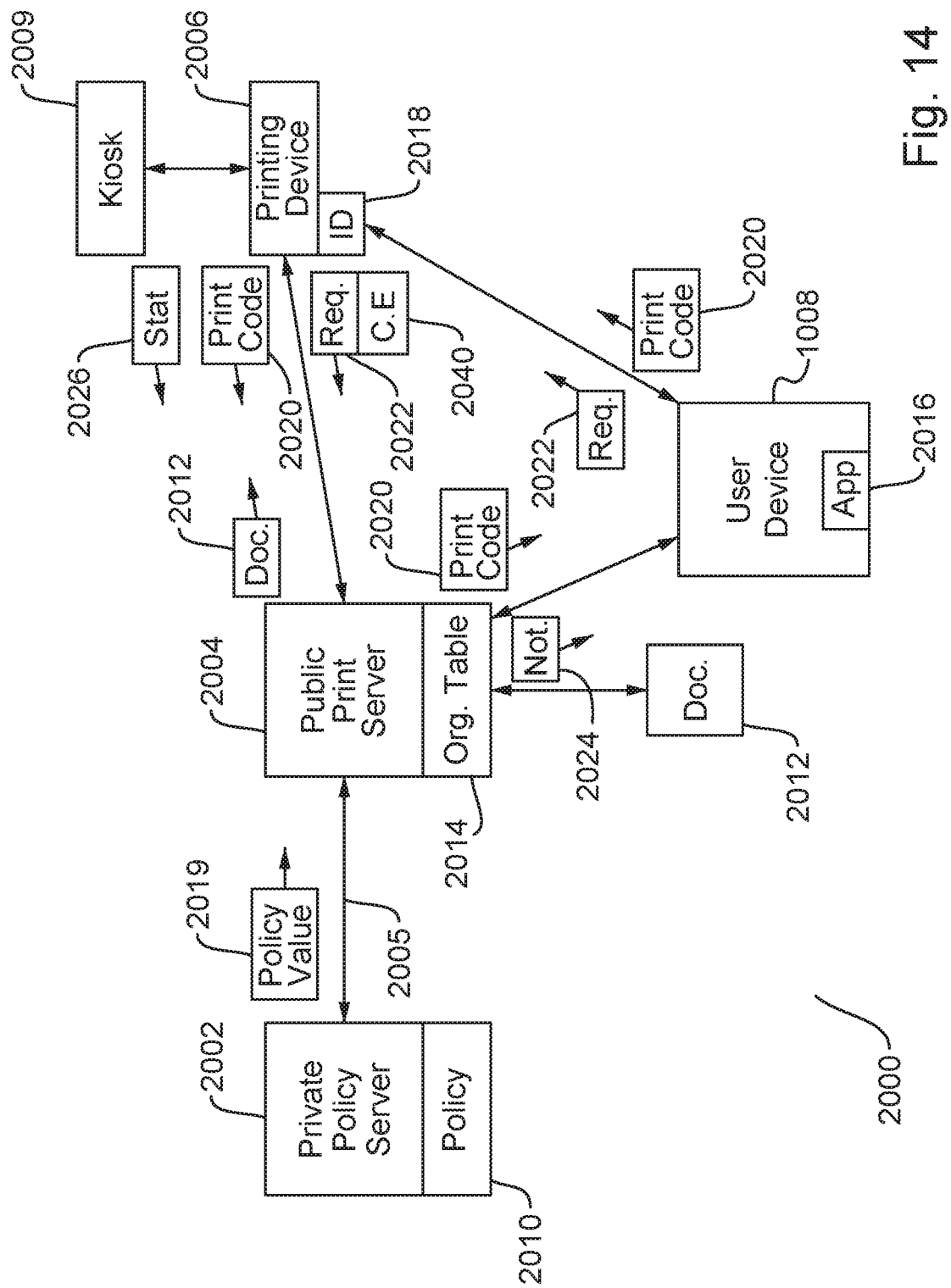
FIG. 14 illustrates a policy-based system to implement printing operations using a public print server according to the disclosed embodiments.

FIG. 14 also depicts a policy-based system 2000 to implement printing operations using a public print server 2004 according to the disclosed embodiments. Policy-based system 2000 may differ from system 100 disclosed above as most of the printing operations, if not all, are performed in the public domain. System 2000 uses a public print server 2004 to manage and approve printing operations on printing devices. Further, the policy and its terms are applied on an organizational level as opposed to a user.

Public print server 2004 may be used to implement a public print service. A user may be required to pay every time that he/she prints a document on a public printing device. Public print services support a "one-time payment for corporate" system where a service provider will charge print costs and fees to companies periodically, such as once a month. This feature allows the user to not pay for printing every time he/she prints a document in the public domain. Companies, however, may not have any idea how much is being charged to their accounts by such public print services. The monthly invoices could become quite costly. Thus, some companies may be interested in managing costs at the printing device.

System 2000 includes printing device 2006 connected to public print server 2004. System 2000 also includes a private policy server 2002 that includes policy 2010. Private policy server 2002 may be connected to public print server 2004 over websocket connection 2005. For normal printing operations, public print server 2004 does not communicate with private policy server for every print job. Instead, public print server 2004 determines whether to allow the print job based on information stored in organization table 2014. Organization table 2014 is disclosed in greater by FIG. 15 below.

A user may access printing device 2006. In some embodiments, the user uses user device 2008 having mobile application 2016 to manage and request print jobs from public print server 2004. As disclosed below, references to the "user" also may include user device 2008. User device 2008 may be a mobile phone, tablet, laptop, and the like. Mobile application 2016 may send and receive data from printing device 2006 and public print server 2004 regarding printing operations within system 2000.

In other embodiments, the user may use kiosk 2009, which is connected to printing device 2006. Kiosk 2009 may allow the user to manage print jobs and make selections. It also may allow the user to pay for print jobs on printing device 2006. Kiosk 2009 also may send and receive data from mobile application 2016. Printing device 2006 may include device identification 2018, which uniquely identifies the printing device within system 2000. When sending data to printing device 2006, user device 2008 and public print server 2004 may identify the printing device using device identification 2018. In some embodiments, device identification 2018 may be an IP address.

The user may upload document 2012 to public print server 2004. In some embodiments, document 2012 is an electronic document or image file of an actual document. It also may be a document created using a computer-based application, such as a word processor, and stored on a device accessible by the user. For example, document 2012 may be stored on user device 2008 and sent to public print server 2004. Alternatively, document 2012 may be a scanned document file. Public print server 2004 stores document 2012.

Public print server 2004 generates a print code 2020 for document 2012. Print code 2020 may be used to retrieve document 2012 when presented to public print server 2004. Print code 2020 may be an alphanumeric code, personal identification number (PIN), graphical code, and the like. Public print server 2004 may store this relationship in organization table 2014. It also provides print code 2020 to the user. In some embodiments, public print server 2004 sends print code 2020 to user device 2008. Mobile application 2016 may receive the code and display it to the user. The user inputs print code 2020 into printing device 2006 to print document 2012.

Public print server 2004 also stores information and data used to determine whether the user can print document 2012. A service provider may host printing operations for several companies, or organizations. The service provider may manage private policy server 2002 to set policies for each organization that uses public printing. For example, policy 2010 may be applied to determine a policy credit value 2019. Policy credit value 2019 is the maximum amount that can be charged to an organization for printing costs during a policy period. For example, organization ABC may set a limit for print jobs using a public print service to S100 per week. The limit is sent to public print server as policy credit value 2020. As different policies may apply to different organizations, organization table 2014 may be used to store and track policy credit values. The service provider may modify policies at private policy server 2002 to update the maximum values for public printing. Thus, public print server 2004 may update organization table 2014 periodically with policy credit values 2020.

When the user wants to print document 2012, he/she may generate a request 2022. Request 2022 is received at printing device 2006. Request 2022 requests permission to print document 2012, which is associated with an organization in organization table 2014. The user may enter the request on printing device 2006 or kiosk 2009. Alternatively, the user may use user device 2008 to send request 2022 electronically to printing device 2006 or kiosk 2009. Printing device 2006 passes request 2022 to public print server 2004.

Public print server 2004 then determines whether enough credit is left on the account for the organization to print document 2012. This process is disclosed in greater detail below. Policy credit value 2022 is used to determine a remaining credit value for the organization. Organization table 2014 may store transactions for the policy period and reduce the remaining credit value in accordance with the cost of each transaction. Thus, as the policy period transpires, the remaining credit value should decrease with print jobs using the public printing service.

Printing device 2006 may determine how much the print job for document 2012 should cost. It may send this amount along with request 2022 to public print server 2004. Public print server 2004 determines whether there is enough remaining credit value to pay for the print job at printing device 2006. For example, an estimated cost value 2040 for printing document 2012 may be determined. Public print server 2004 compares estimated cost value 2040 to the remaining credit value in organization table 2014. If estimated cost value 2040 is less than the remaining credit value for the organization, then notification 2024 is sent from public print server 2004 to the user, or to user device 2008. If it is not, then printing operations are cancelled. Public print server 2004 also may send the result of the determination to printing device 2006 to let it know that print code 2020 may be entered.

The user enters print code 2020. In some embodiments, the code for print code 2020 may be entered or provided directly to printing device 2006 or kiosk 2009. In other embodiments, mobile application 2016 may forward data for print code 2020 to printing device 2006. Printing device 2006 forwards print code 2020 to public print server 2004. After verifying print code 2020, public print server 2020 retrieves the associated document and sends it to printing device 2006.

Printing device 2006 prints document 2012. In some embodiments, document 2012 may be sent to kiosk 2009 before being provided to printing device 2006. Kiosk 2009 may allow the user to confirm document 2012 is to be printed and the costs associated therewith. After printing operations are complete, printing device 2006 may generate statistics 2026 which includes the actual cost to print the document. Statistics 2026 also may include the number of pages printed, user information, time of printing, and the like. This information is sent to public print server 2004. Public print server 2004 updates organization table accordingly and calculates the new remaining credit value as well as creates an entry for the print job.

FIG. 15 depicts organization table 2014 on public print server 2004 according to the disclosed embodiments. As disclosed above, organization table 2014 is used in determining whether a print job within system 2000 may proceed. It is stored on public print server 2004. One or more organizations may be represented in organization table 2014 as the service provider using private policy server 2002 may provide printing services for multiple companies and organizations. Thus, multiple policies may be used determining whether to print documents using system 2000.

FIG. 11 shows ledgers 2101A and 2101X for Organization B and Organization Y, respectively. Additional organizations may have ledgers in organization table 2014. Each organization may correspond to a policy 2010 stored on private policy server 2002. In some embodiments, an administrator may set the values within organization table 2014. In other embodiments, the values are proscribed by the corresponding policy. Policies also may be stored on public print server 2004.

Each ledger may include fields to store information related to the associated organization. Ledger 2101A includes information for Organization B. Field 2102A may include data about user(s) allowed to public print within the organization. Email addresses, user names, passwords, employee identifications, and the like also may be stored here so that public print server 2004 may verify the identity of a user when he/she tries to print within system 2000. This information also may be used to generate print code 2020 for a document uploaded to public print server 2004.

Field 2019A may correspond to the policy credit value specified for Organization B. Organization table 2014 receives policy credit value 2019 from the service provider. In some embodiments, this value is set by the corresponding policy for Organization B. Private policy server 2002 may provide this data. The policy credit value is used to determine a remaining credit value, as stored in field 2106A (hereinafter referred to as remaining credit value 2106A). Organization table 2014 uses entries 2108A, 2110A, and 2112A to determine remaining credit value 2106A for a print job by a user within Organization B.

For example, the policy credit value for Organization B may be $100. Entry 2108A refers to a print job approved by public print server 2004 for $5. After this transaction, remaining credit value 2106A would be $95. Entries 2110A and 2112A may refer to other print jobs costing $10 and $2, respectively. These transactions reduce the remaining credit value accordingly to $83. When a request is received from printing device 2006 for new print job, draft entry 2114A is used to determine whether there is enough remaining credit value 2106A to perform the print job. In this instance, the remaining credit value is $83 so the print job may be allowed. After the print is complete, public print server 2004 receives statistics 2026 and draft entry 2114A becomes an entry into ledger 2101A. The remaining credit value is now $82.

Organization table 2014 also includes ledger 2101X for Organization Y. Field 2102X may include a policy credit value of $75. Thus, policy credit values are not uniform across organizations. Entries 2108X and 2110X are used to determine remaining credit value 2106X. If entry 2108X is $50 and entry 2110X is $20, then a print job request from a user within Organization Y having a cost of $10 will be denied. Public print server 2004 may send notification 2024 to printing device 2006 or user device 2008 that the user may not print the document using the public print service. The user may need to pay at the point of printing instead. Alternatively, if the print job is $2, then remaining credit value 2106X will allow the printing operations.

Figure 16:
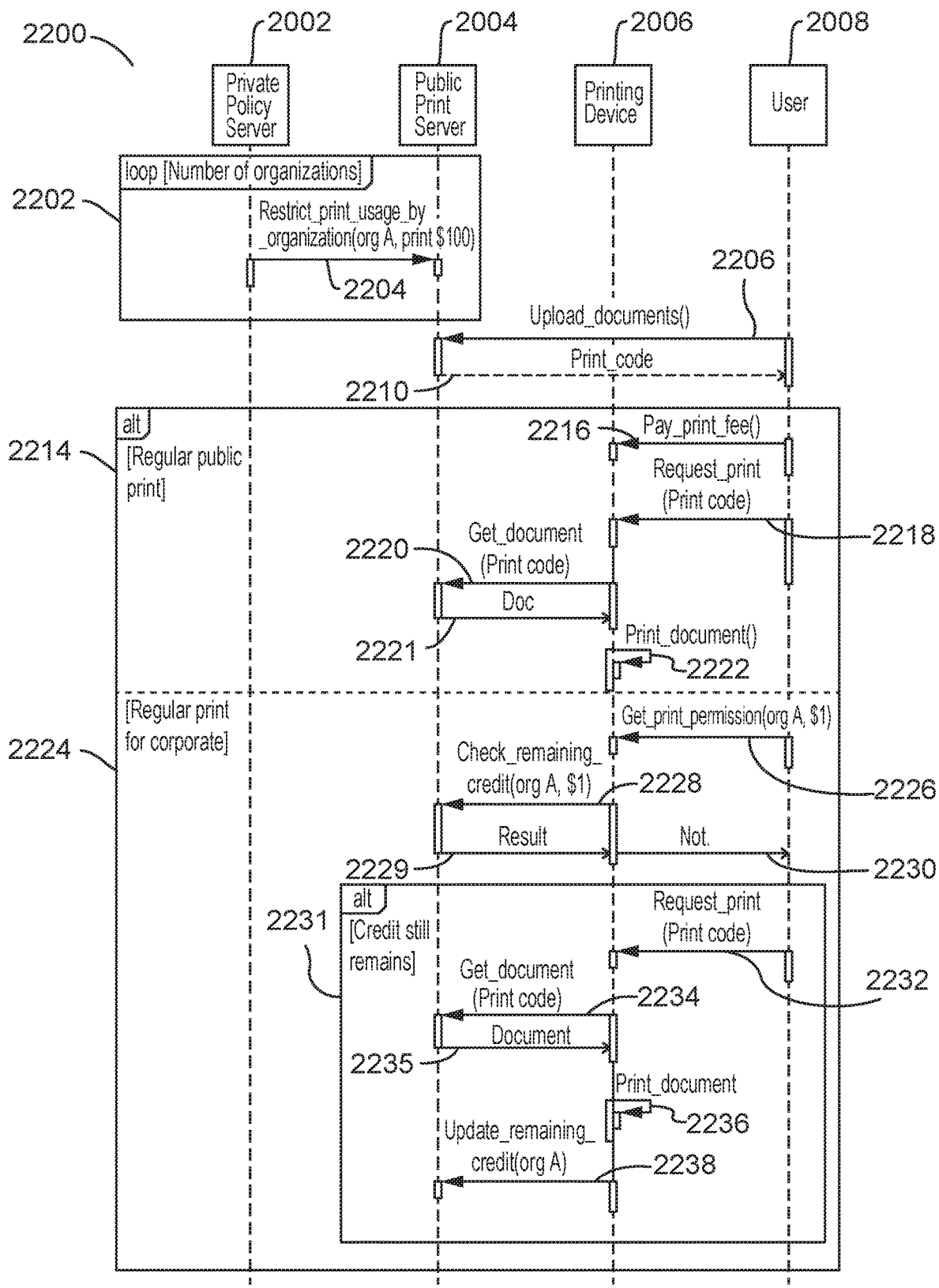
FIG. 16 illustrates a flow diagram for printing a document at a printing device in the policy-based system according to the disclosed embodiments.

FIG. 16 depicts a flow diagram 2200 for printing document 2012 at printing device 2006 in policy-based system 2000 according to the disclosed embodiments. Flow diagram 2200 may refer to FIGS. 1-15 for illustrative purposes. The embodiments disclosed by flow diagram 2200, however, are not limited to those disclosed by FIGS. 1-15.

Process 2202 relates to the service provider providing the policy credit values for the organizations using the public print service. For example, each organization or company may have a ledger in organization table 2014. There may be any number of organizations. For each organization, operation 2204 is executed to restrict print usage by a policy credit value 2019. This value is stored in the corresponding ledger. For Organization B, the policy credit value may be $100, as shown in field 2019A. Ledger 2101A is updated accordingly. Operation 2204 is repeated until organization table 2014 includes entries for each organization.

In some embodiments, private policy server 2002 may be used to generate the policy credit values. A policy 2010 for the organization sets forth the maximum print usage for a policy period and is used to generate policy credit value 2019. Operation 2204 sends policy credit value 2019 to public print server 2004 to store in organization table 2019. Process 2202 may be performed as needed or periodically to update the policy credit values on public print server 2004.

Operation 2206 executes by the user uploading document 2012 to public print server 2004. As disclosed above, document 2012 may be sent from another server within system 2000. It also may be scanned and uploaded to public print server 2004. Alternatively, document 2012 may be uploaded from user device 2008. User device 2008 may capture document 2012 using mobile application 2016 and forward this file to the public print server. Public print server 2004 stores document 2012. It also may verify that the user belongs to an organization within organization table 2014 and is allowed to use the public print service.

Operation 2210 executes by generating print code 2020 at public print server 2004 and sending it to the user. In some embodiments, print code 2020 may be received at user device 2008 by mobile application 2016. The user may use print code 2020 to print document 2012 within system 2000.

Print code 2020 is uniquely assigned to document 2012 to prevent the printing of other documents not available to the user.

Process 2214 relates to the operations to print document 2012 using regular printing operations. Operation 2216 executes by paying the print fee by the user at printing device 2006 or kiosk 2009. Operation 2218 executes by the user entering or sending print code 2020 to printing device 2006 or kiosk 2009. Mobile application 2016 may send print code 2020 to printing device 2006 or kiosk 2009. Operation 2220 executes by getting document 2012 using print code 2020. Printing device 2006 forwards print code 2020 to public print server 2004. Public print server 2004 matches print code 2020 to document 2012. It also may verify that the user can print the document according to any applicable policy. Operation 2221 executes by providing document 2012 to printing device 2006 from public print server 2004. Operation 2222 executes by printing document 2012 at printing device 2006. As the user paid for the print operations in operation 2216, process 2214 may be complete.

Process 2224 relates to printing a document using the public print service for the organization of the user. Process 2224 uses the information stored on public print server 2004 to determine whether the user can print the document without having to pay at the printing device, such as done in process 2214. Operation 2226 executes by submitting a permission request to print document 2012 on printing device 2006. The user may generate and submit the request on printing device 2006 or kiosk 2009. Alternatively, the user may submit the request using mobile application 2016 on user device 2008. The user may select a document from a list or menu and submit the request to printing device 2006. Printing device 2006 or kiosk 2009 may calculate an estimated cost for the print job of document 2012.

Operation 2228 executes by sending the request and the estimated cost for the print job from printing device 2006 or kiosk 2009 to public print server 2004. Public print server 2004 then compares the estimated cost for the print job to the remaining credit value. If the user is within Organization B, then public print server 2004 uses remaining credit value 2106A based on policy credit value 2019A to determine whether the print job is allowed. If enough credit remains for Organization B, then public print server 2004 allows document 2012 to be printed.

Operation 2229 executes by the result of the determination to printing device 2006 or kiosk 2009 from public print server 2004. The result may indicate that the print job is allowed. Operation 2230 executes by sending notification 2024 to the user that the print job is allowed. In some embodiments, notification 2024 is received at mobile application 2016 on user device 2008. The user may be prompted by user device 2008. Notification 2024 may be sent by public print server 2004 or printing device 2006.

Sub-process 2231 of process 2224 relates to printing document 2012 after receiving approval from public print server 2004. Operation 2232 executes by sending request 2022 to printing device 2006 or kiosk 2009. In some embodiments, the user enters print code 2020 into printing device 2006 or kiosk 2009. The user inputs the code using an operations panel or other input device. Alternatively, print code 2020 may be sent electronically from user device 2008 using mobile application 2016. Request 2022 may include print code 2020.

Operation 2234 executes by sending print code 2020 to public print server 2004, much like operation 2220 disclosed above. Print code 2020 is used to retrieve document 2012 on public print server 2004. Operation 2235 executes by sending document 2012 to printing device 2006 or kiosk 2009. Operation 2236 executes by printing document 2012 at printing device 2006. The user may pick up the printed document and confirm receipt using the printing device or the kiosk, or the mobile application on user device 2008.

Operation 2238 executes by updating organization table 2014 with statistics 2026 generated by printing device 2006. Printing device 2006 may determine the final cost for the print job of document 2012 as well as other information. Statistics 2026 may be sent electronically to public print server 2004. An entry is created in the appropriate ledger to reflect the transaction and adjust the remaining credit value for the organization. Statistics 2026 also may be sent to the user through mobile application 2016. In some embodiments, statistics 2026 may be sent to private policy server 2002 for tracking costs and information by the service provider.

Figure 17:
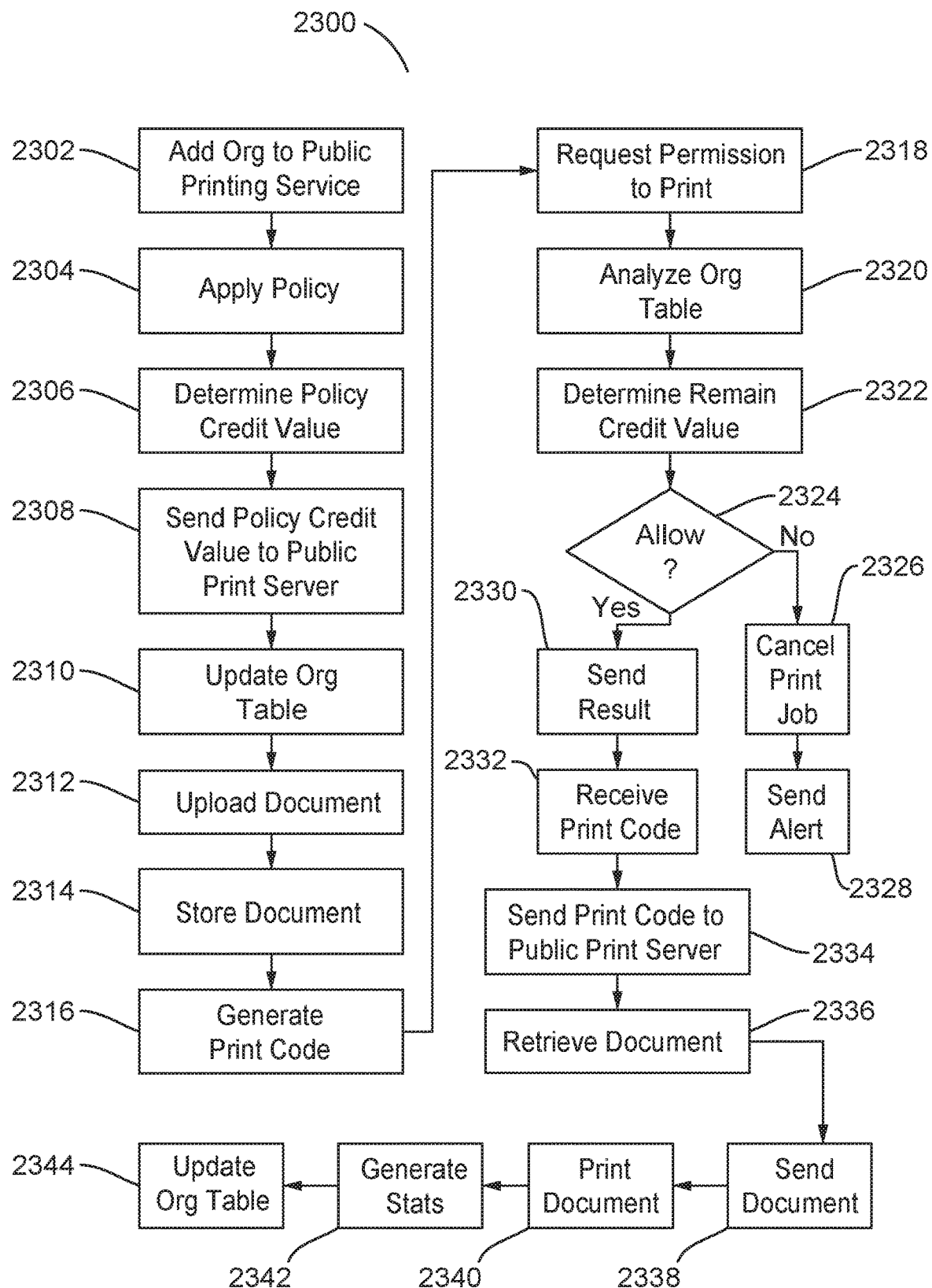
FIG. 17 illustrates a flowchart for using the printing device and a public print server to print a document in the policy-based system according to the disclosed embodiments.

FIG. 17 depicts a flowchart 2300 for using printing device 2006 and public print server 2004 to print document 2012 in policy-based system 2000 according to the disclosed embodiments. Flowchart 2300 may refer to FIGS. 1-16 for illustrative purposes. Flowchart 2300, however, is not limited to the embodiments disclosed by FIGS. 1-16.

Step 2302 executes by adding an organization to the public printing service provided by a service provider. In some embodiments, private policy server 2002 stores information on the organization including a policy 2010 that sets forth various parameters for restricting print usage using the public print service. Step 2304 executes by applying policy 2010 to determine the print usage restrictions for the organization. One of the restrictions may be the maximum amount that users may charge for public printing on devices outside the organization. Policy 2010 sets forth this maximum amount for a policy period. After the policy period is complete, the maximum amount may be reapplied to restrict print usage.

Step 2306 executes by determining policy credit value 2019 according to policy 2010. Policy credit value 2019 may be the maximum amount to be charged for the policy period. In other embodiments, policy credit value 2019 may be an amount that, when used through printing operations using the public print service, requires the service provider to query the organization whether to continue to allow public printing and to pay more for the service. In other words, the organization may replenish the account based on anticipated printing costs. Step 2308 executes by sending policy credit value 2019 to public print server 2004. In some embodiments, the service provider may set policy credit value 2019 at public print server 2004.

Step 2310 executes by updating organization table 2014 with policy credit value 2019 for the organization. For example, if policy credit value 2019 pertains to Organization B, then ledger 2101A for the organization is updated or created to include this value in field 2019A. This value may be stored in organization table 2014 until updated or changed.

Step 2312 executes by uploading document 2012 to public print server 2004. This step may occur before or after steps 2302-2310 disclosed above. The user uploads an electronic document to public print server 2004 to have available to print within the public print service. Step 2314 executes by storing document 2012 on public print server 2004. Public print server 2004 may have an account for the user correlating to ledger 2101A for Organization B.

Step 2316 executes by generating print code 2020 for document 2012. Print code 2020 will cause public print server 2004 to identify document 2012 for print jobs when received within system 2000. As disclosed above, print code 2020 may be an alphanumeric code, graphical code, PIN, and the like. Print code 2020 is sent to the user. User device 2008 may receive print code 2020 to store and present to the user when needed. Mobile application 2016 may store print code 2020 and associate it with document 2012.

Step 2318 executes by requesting permission to print document at printing device 2006 by the user. When the user is ready to print using the public print service, he/she may select a printing device 2006 at a location. The user may enter authentication information such as a user name, password, employee identification, and the like to generate the permission request. An estimated cost for the print job also may be determined and added to the permission request. For example, using kiosk 2009 connected to printing device 2006, the user may enter information and request that printing operations be confirmed by on the applicable organization. This information is forwarded to public print server 2004. In some embodiments, this information may be sent by user device 2008 to public print server 2004 without the need to enter it onto printing device 2006. Public print server 2004 may recognize the request coming from mobile application 2016 registered to Organization B.

Step 2320 executes by analyzing organization table 2014 to determine the values needed to approve the permission request for the print job. Public print server 2004 may use the user information to identify the appropriate ledger 2101A for Organization B. Step 2322 executes by determining the remaining credit value for Organization B using ledger 2101A in organization table 2014. Using the policy credit value, the remaining credit value is determined using entries within ledger 2101A for previous transactions to reduce the policy credit value to a current amount that is left over for printing operations. Referring to FIG. 15, remaining credit value 2106A is determined by subtracting entries 2108A, 2110A, and 2112A from policy credit value 2019A.

Step 2324 executes by determining whether to allow the print job for document 2012 according to the remaining credit value. The estimated cost to print document 2012 is compared to the remaining credit value. If it exceeds the remaining credit value, then the print job will not be allowed. If the estimated cost can be charged to Organization B, then document 2012 may be printed.

If step 2324 is no, then step 2326 executes by cancelling the print job. The permission request is denied by public print server 2004. Step 2328 executes by sending an alert to the user or to printing device 2006. The alert may be notification 2024 sent to user device 2008. Mobile application 2016 receives the notification and alerts the user. Public policy server 2004 also may send an alert to private policy server 2002 to inform the service provider. The service provider then may update ledger 2101A for Organization B to increase the policy credit value.

If step 2324 is yes, then step 2330 executes by sending the result to printing device 2006 from public policy server 2004. Public policy server 2004 also may send notification 2024 to the user or user device 2008 that the print job is approved. Printing device 2006 is configured to print a document for the user. Step 2332 executes by receiving print code 2020 at printing device 2006 or kiosk 2009. As disclosed above, print code 2020 may be entered at the printing device or the kiosk. Alternatively, user device 2008 may provide print code 2020 electronically to printing device 2006 or kiosk 2009.

Step 2334 executes by sending print code 2020 to public print server 2004. Preferably, printing device 2006 sends print code 2020. In some embodiments, user device 2008 may send print code 2020 to public print server 2004. Upon receipt, public print server 2004 may verify the print code and associate it with a document stored thereon. Step 2336 executes by retrieving document 2012 associated with print code 2020. Step 2338 executes by sending document 2012 to printing device 2006 from public print server 2004. Step 2340 executes by printing document 2012 at printing device 2006.

Step 2342 executes by generating statistics 2026 for the print job. Statistics may include the number of pages printed, the actual cost for the print job, device identification 2018 for the printing device, and other information. Step 2344 executes by updating organization table 2014 with statistics 2026. Printing device 2006 sends statistics 2026 to public print server 2004. An entry may be created in the ledger for the organization and the remaining credit value updated to reflect the cost of the print job. In some embodiments, if the actual costs result in the policy credit value being exceeded, public print server 2004 may alert the service provider through private policy server 2002. Further print job requests may be denied by public print server 2004.

In a first alternate embodiment, a policy-based printing system includes a public print server to store a document from a user, wherein the public print server includes an organization table having at least one organization associated with the user;

a private policy server connected to the public print server, wherein the private policy server includes a policy for the at least one organization in the organization table, wherein each of the at least one organization has a policy credit value set by the policy and stored in the organization table; and a printing device to print the document from the public print server, and wherein the public print server is configured to determine a remaining credit value for the at least one organization based on the policy credit value and to send the document to the printing device based upon the remaining credit value.

The first alternate embodiment also includes a private policy server to store the policy, wherein the private policy server is connected to the public print server.

The first alternate embodiment also includes that the organization table includes a ledger for the at least one organization to store the policy credit value and the remaining credit value.

The first alternate embodiment also includes that the public print server is configured to generate a print code for the user.

The first alternate embodiment also includes that the printing device is configured to receive the print code and send the print code to the public print server.

The first alternate embodiment also includes that the public print server is configured to identify the document based on the print code.

In a second alternate embodiment, a policy-based printing method includes restricting print usage for an organization using a policy credit value set forth in a policy at a public print server;

generating a print code for a document stored on the public print server to a user within the organization;

sending the print code to a user device for the user;

determining a remaining credit value for the organization at the public print server using the policy credit value and an organization table;

requesting the document to print on a printing device connected to the public print server using the print code;

determining whether to allow the document to print according to the remaining credit value; and printing the document at the printing device if allowed.

The second alternate embodiment also includes uploading the document to the public print server to generate the print code.

The second alternate embodiment also includes associating the user with the organization.

The second alternate embodiment also includes determining the policy credit value at a private policy server using the policy.

The second alternate embodiment also includes that the policy is stored at the private policy server.

The second alternate embodiment also includes sending a notification to the user device that the document is to be printed at the printing device.

The second alternate embodiment also includes determining a cost for printing the document at the printing device.

The second alternate embodiment also includes updating the remaining credit value for the organization in the organization table based on the cost.

In a third alternate embodiment, a policy-based printing method includes applying a policy at a private policy server to determine a policy credit value for an organization;

updating an organization table at a public print server with the policy credit value for the organization;

uploading a document to the public print server from a user of the organization;

generating a print code for the document;

requesting the document to be printed on a printing device connected to the public print server;

determining a remaining credit value for the organization based on the organization table and the policy credit value;

determining whether to print the document according to the remaining credit value at the public print server;

sending the document to the printing device from the public print server based on the determining whether to print step; and printing the document at the printing device.

The third alternate embodiment also includes determining a cost for printing the document.

The third alternate embodiment also includes updating the remaining credit value in the organization table at the public print server.

The third alternate embodiment also includes denying the sending of the document to the printing device based on the determining whether to print step.

The third alternate embodiment also includes sending the print code to a user device for the user.

The third alternate embodiment also includes receiving the print code for the document at the printing device from the user device.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operations, elements, components, and/or groups thereof.

Embodiments may be implemented as a computer process, a computing system or as an article of manufacture such as a computer program product of computer readable media. The computer program product may be a computer storage medium readable by a computer system and encoding computer program instructions for executing a computer process. When accessed, the instructions cause a processor to enable other components to perform the functions disclosed above.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

One or more portions of the disclosed networks or systems may be distributed across one or more multi-functional printer (MFP) systems coupled to a network capable of exchanging information and data. Various functions and components of the MFP system may be distributed across multiple client computer platforms, or configured to perform tasks as part of a distributed system. These components may be executable, intermediate or interpreted code that communicates over the network using a protocol. The components may have specified addresses or other designators to identify the components within the network.

It will be apparent to those skilled in the art that various modifications to the disclosed may be made without departing from the spirit or scope of the invention. Thus, it is intended that the present invention covers the modifications and variations disclosed above provided that these changes come within the scope of the claims and their equivalents.

What is claimed is:

1. A policy-based printing system comprising:
a public print service to manage documents for an organization, wherein the public print service is a cloud-based network;
a cloud-based public server to store a document from a user associated with the organization, wherein the public server includes an organization table for the organization associated with the user;
wherein the organization has a policy credit value for print jobs within the public print service, the policy credit value is stored in the organization table; and
a printing device to print the document from the public server through the public print service,
wherein the public server is configured to determine a remaining credit value for the organization based on the policy credit value and to send the document to the printing device based upon the remaining credit value, and
wherein the public server is configured to generate a print code for the user.

2. The policy-based printing system according to claim 1, wherein the public server includes a policy for the organization that sets forth the policy credit value.

3. The policy-based printing system according to claim 1, wherein the organization table includes a ledger for the at least one organization to store the policy credit value and the remaining credit value.

4. The policy-based printing system according to claim 1, wherein the printing device is configured to receive the print code from the user and send the print code to the public server.

5. The policy-based printing system according to claim 4, wherein the public server is configured to identify the document based on the print code.

6. A policy-based printing method comprising:
accessing a cloud-based public print service from a printing device;
restricting print usage within the public print service for an organization using a policy credit value provided at a cloud-based public server;
generating a print code for a document stored on the public server to a user within the organization;
sending the print code to a user device for the user;
determining a remaining credit value for the organization at the public server using the policy credit value and an organization table;
requesting the document to print on the printing device connected to the public print service using the print code;
determining whether to allow the document to print according to the remaining credit value; and
printing the document at the printing device, if allowed.

7. The policy-based printing method of claim 6, further comprising uploading the document to the public server to generate the print code.

8. The policy-based printing method of claim 6, further comprising associating the user with the organization.

9. The policy-based printing method of claim 6, further comprising determining the policy credit value at the public server using a policy for the organization.

10. The policy-based printing method of claim 9, wherein the policy is stored at the public server.

11. The policy-based printing method of claim 6, further comprising sending a notification to the user device that the document is to be printed at the printing device.

12. The policy-based printing method of claim 6, further comprising determining a cost for printing the document at the printing device using the public print service.

13. The policy-based printing method of claim 12, further comprising updating the remaining credit value for the organization in the organization table based on the cost at the public server.

14. A policy-based printing method comprising:
applying a policy credit value for an organization at a public server;
updating an organization table at a public server with the policy credit value for the organization;
uploading a document to the public server from a user of the organization using a cloud-based public print service;
generating a print code for the document;
accessing the cloud-based public print service through a printing device;
requesting the document to be printed on the printing device connected to the public print service;
determining a remaining credit value for the organization based on the organization table and the policy credit value at the public server;
determining whether to print the document according to the remaining credit value at the public server;
sending the document to the printing device from the public server based on the determining whether to print step; and
printing the document at the printing device using the public print service.

15. The policy-based printing method of claim 14, further comprising determining a cost for printing the document within the public print service.

16. The policy-based printing method of claim 15, further comprising updating the remaining credit value in the organization table at the public server.

17. The policy-based printing method of claim 14, further comprising denying the sending of the document to the printing device based on the determining whether to print step.

18. The policy-based printing method of claim 14, further comprising sending the print code to a user device for the user through the public print service.

19. The policy-based printing method of claim 18, further comprising receiving the print code for the document at the printing device from the user device.

* * * * *